United States Patent
Weder

(10) Patent No.: US 6,701,667 B2
(45) Date of Patent: *Mar. 9, 2004

(54) METHOD OF SECURING A PLANT COVER ABOUT A POT

(75) Inventor: Donald E. Weder, Highland, IL (US)

(73) Assignee: Southpac Trust International, Inc.

( * ) Notice: Subject to any disclaimer, the term of this patent is extended or adjusted under 35 U.S.C. 154(b) by 13 days.

This patent is subject to a terminal disclaimer.

(21) Appl. No.: 10/051,116

(22) Filed: Jan. 17, 2002

(65) Prior Publication Data

US 2002/0062595 A1 May 30, 2002

Related U.S. Application Data

(63) Continuation of application No. 09/895,302, filed on Jun. 29, 2001, now Pat. No. 6,343,456, which is a continuation of application No. 09/626,375, filed on Jul. 26, 2000, now abandoned, which is a continuation of application No. 09/366,630, filed on Aug. 3, 1999, now Pat. No. 6,192,657, which is a continuation of application No. 09/025,090, filed on Feb. 17, 1998, now Pat. No. 5,930,979, which is a continuation of application No. 08/775,516, filed on Jan. 2, 1997, now Pat. No. 5,740,658, which is a continuation of application No. 08/460,180, filed on Jun. 2, 1995, now Pat. No. 5,617,703, which is a continuation of application No. 08/237,078, filed on May 3, 1994, now Pat. No. 5,625,979, which is a continuation-in-part of application No. 08/220,852, filed on Mar. 31, 1994, now Pat. No. 5,572,851.

(51) Int. Cl.[7] .................................................. A01G 9/02
(52) U.S. Cl. ............................................................ 47/72
(58) Field of Search ................................. 47/72; 53/397

(56) References Cited

U.S. PATENT DOCUMENTS

| 524,219 A | 8/1894 | Schmidt |
|---|---|---|
| 732,889 A | 7/1903 | Paver |
| 950,785 A | 3/1910 | Pene |
| 1,044,260 A | 11/1912 | Schloss |
| 1,063,154 A | 5/1913 | Bergen |

(List continued on next page.)

FOREIGN PATENT DOCUMENTS

| AU | 4231978 | 6/1979 |
|---|---|---|
| BE | 654427 | 1/1965 |
| CH | 560532 | 4/1975 |
| DE | 15550 | 6/1900 |
| DE | 345464 | 12/1921 |
| DE | 513971 | 11/1930 |
| DE | 1166692 | 3/1964 |
| DE | 1962947 | 6/1971 |
| DE | 2060812 | 11/1971 |
| DE | 2748626 | 5/1979 |
| DE | 3445799 | 6/1986 |

(List continued on next page.)

OTHER PUBLICATIONS

Speed Cover Brochure, "The Simple Solution For Those Peak Volume Periods", Highland Supply Corporation, ©1989.

"Speed Sheets and Speed Rolls" Brochure, Highland Supply Corporation, ©1990.

"Color Them Happy with Highlander Products" ©1992.

"Costa Keeps the Christmas Spirit", Supermarket Floral, Sep. 15, 1992.

(List continued on next page.)

*Primary Examiner*—Charles T. Jordan
*Assistant Examiner*—Francis T. Palo
(74) *Attorney, Agent, or Firm*—Dunlap, Codding & Rogers P.C.

(57) ABSTRACT

A method of covering a pot with a plant cover, the plant cover at least comprising a base portion, and optionally having a skirt or a detachable upper portion. The plant cover has a heat shrinkable bonding material which can be heat shrunk to secure the plant cover about the pot.

28 Claims, 23 Drawing Sheets

U.S. PATENT DOCUMENTS

| | | |
|---|---|---|
| 1,446,563 A | 2/1923 | Hughes |
| 1,520,647 A | 12/1924 | Hennigan |
| 1,525,015 A | 2/1925 | Weeks |
| 1,610,652 A | 12/1926 | Bouchard |
| 1,697,751 A | 1/1929 | Blake .......................... 229/87 |
| 1,794,212 A | 2/1931 | Snyder |
| 1,811,574 A | 6/1931 | Barrett |
| 1,863,216 A | 6/1932 | Wordingham |
| 1,978,631 A | 10/1934 | Herrlinger ...................... 91/68 |
| 2,048,123 A | 7/1936 | Howard ........................ 229/87 |
| RE21,065 E | 5/1939 | Copeman ......................... 93/2 |
| 2,170,147 A | 8/1939 | Lane ............................ 206/56 |
| 2,200,111 A | 5/1940 | Bensel ........................ 229/1.5 |
| 2,278,673 A | 4/1942 | Savada et al. ................ 154/43 |
| 2,302,259 A | 11/1942 | Rothfuss ........................ 41/10 |
| 2,323,287 A | 7/1943 | Amberg ......................... 229/53 |
| 2,355,559 A | 8/1944 | Renner .......................... 229/8 |
| 2,371,985 A | 3/1945 | Freiberg ........................ 206/46 |
| 2,411,328 A | 11/1946 | MacNab ........................ 33/12 |
| 2,510,120 A | 6/1950 | Leander ....................... 117/112 |
| 2,529,060 A | 11/1950 | Trillich ...................... 117/68.5 |
| 2,621,142 A | 12/1952 | Wetherell ................... 154/117 |
| 2,648,487 A | 8/1953 | Linda ........................... 229/55 |
| 2,688,354 A | 9/1954 | Berger ......................... 150/28 |
| 2,774,187 A | 12/1956 | Smithers ........................ 47/41 |
| 2,822,287 A | 2/1958 | Avery .......................... 117/14 |
| 2,846,060 A | 8/1958 | Yount .......................... 206/58 |
| 2,850,842 A | 9/1958 | Eubank, Jr. ..................... 47/58 |
| 2,883,262 A | 4/1959 | Borin ........................... 21/56 |
| 2,989,828 A | 6/1961 | Warp ........................... 53/390 |
| 3,022,605 A | 2/1962 | Reynolds ....................... 47/58 |
| 3,080,680 A | 3/1963 | Reynolds ....................... 47/37 |
| 3,094,810 A | 6/1963 | Kalpin .......................... 47/37 |
| 3,121,647 A | 2/1964 | Harris et al. ................. 118/202 |
| 3,130,113 A | 4/1964 | Silman ........................ 161/97 |
| 3,271,922 A | 9/1966 | Wallerstein et al. ............. 53/3 |
| 3,316,675 A | 5/1967 | Cartwright, Jr. |
| 3,322,325 A | 5/1967 | Bush ........................... 229/62 |
| 3,376,666 A | 4/1968 | Leonard ........................ 47/41 |
| 3,380,646 A | 4/1968 | Doyen et al. ................. 229/57 |
| 3,431,706 A | 3/1969 | Stuck .......................... 53/390 |
| 3,508,372 A | 4/1970 | Wallersetein et al. ............ 53/3 |
| 3,510,054 A | 5/1970 | Sanni et al. ................... 229/66 |
| 3,512,700 A | 5/1970 | Evans et al. .................. 229/53 |
| 3,550,318 A | 12/1970 | Remke et al. ................. 47/37 |
| 3,552,059 A | 1/1971 | Moore ....................... 47/41.12 |
| 3,554,434 A | 1/1971 | Anderson .................... 229/55 |
| 3,556,389 A | 1/1971 | Gregoire ...................... 229/53 |
| 3,557,516 A | 1/1971 | Brandt ......................... 53/14 |
| 3,620,366 A | 11/1971 | Parkinson .................... 206/59 |
| 3,681,105 A | 8/1972 | Milutin ....................... 117/15 |
| 3,767,104 A | 10/1973 | Bachman et al. .............. 229/7 |
| 3,793,799 A | 2/1974 | Howe ........................... 53/32 |
| 3,869,828 A | 3/1975 | Matsumoto ................ 47/34.11 |
| 3,888,443 A | 6/1975 | Flanigen ..................... 248/152 |
| 3,962,503 A | 6/1976 | Crawford ..................... 428/40 |
| 4,043,077 A | 8/1977 | Stonehocker ................. 47/66 |
| 4,054,697 A | 10/1977 | Reed et al. .................... 428/40 |
| 4,091,925 A | 5/1978 | Griffo et al. ................. 206/423 |
| 4,113,100 A | 9/1978 | Soja et al. ................... 206/602 |
| 4,118,890 A | 10/1978 | Shore ........................... 47/28 |
| 4,189,868 A | 2/1980 | Tymchuck et al. ............. 47/84 |
| 4,216,620 A | 8/1980 | Weder et al. ................... 47/72 |
| 4,248,347 A | 2/1981 | Trimbee ...................... 206/423 |
| D259,333 S | 5/1981 | Charbonneau .............. D9/306 |
| 4,265,049 A | 5/1981 | Gorewitz ....................... 47/26 |
| 4,280,314 A | 7/1981 | Stuck .......................... 53/241 |
| 4,297,811 A | 11/1981 | Weder .......................... 47/72 |
| 4,333,267 A | 6/1982 | Witte ........................... 47/84 |
| 4,347,686 A | 9/1982 | Wood ........................... 47/73 |
| 4,380,564 A | 4/1983 | Cancio et al. ............... 428/167 |
| 4,400,910 A | 8/1983 | Koudstall et al. ............... 47/84 |
| 4,413,725 A | 11/1983 | Bruno et al. ............. 206/45.33 |
| D279,279 S | 6/1985 | Wagner ...................... D11/143 |
| 4,546,875 A | 10/1985 | Zweber .................... 206/0.82 |
| 4,621,733 A | 11/1986 | Harris ........................ 206/423 |
| 4,640,079 A | 2/1987 | Stuck .......................... 53/390 |
| 4,717,262 A | 1/1988 | Roen et al. ................. 383/120 |
| 4,733,521 A | 3/1988 | Weder et al. ................. 53/580 |
| 4,765,464 A | 8/1988 | Ristvedt .................... 206/0.82 |
| 4,771,573 A | 9/1988 | Stengel ......................... 47/67 |
| 4,773,182 A | 9/1988 | Weder et al. ................... 47/72 |
| 4,801,014 A | 1/1989 | Meadows ................... 206/423 |
| 4,810,109 A | 3/1989 | Castel ........................ 383/105 |
| 4,835,834 A | 6/1989 | Weder ......................... 29/525 |
| D301,991 S | 7/1989 | Van Sant .................... D11/149 |
| 4,941,572 A | 7/1990 | Harris ........................ 206/423 |
| 4,946,290 A | 8/1990 | Matyja ......................... 383/10 |
| 4,980,209 A | 12/1990 | Hill ........................... 428/34.1 |
| 4,989,396 A | 2/1991 | Weder et al. ................. 53/397 |
| D315,700 S | 3/1991 | Stephens .................... D11/151 |
| 5,005,760 A | 4/1991 | van den Hoogen .... 229/125.38 |
| 5,073,161 A | 12/1991 | Weder et al. ............... 493/154 |
| 5,074,675 A | 12/1991 | Osgood ...................... 383/122 |
| 5,105,599 A | 4/1992 | Weder ......................... 53/399 |
| 5,111,638 A | 5/1992 | Weder ......................... 53/397 |
| 5,120,382 A | 6/1992 | Weder ........................ 156/212 |
| 5,152,100 A | 10/1992 | Weder et al. ................... 47/72 |
| 5,181,364 A | 1/1993 | Weder ......................... 53/397 |
| D335,105 S | 4/1993 | Ottenwalder et al. ....... D11/164 |
| 5,199,242 A | 4/1993 | Weder et al. ................. 53/397 |
| 5,205,108 A | 4/1993 | Weder et al. ................. 53/397 |
| 5,228,234 A | 7/1993 | de Klerk et al. ........... 47/41.01 |
| 5,235,782 A | 8/1993 | Landau ......................... 47/72 |
| 5,239,775 A | 8/1993 | Landau ......................... 47/72 |
| 5,249,407 A | 10/1993 | Stuck .......................... 53/399 |
| 5,259,106 A | 11/1993 | Weder et al. .............. 29/469.5 |
| 5,307,606 A | 5/1994 | Weder ......................... 53/410 |
| 5,315,785 A | 5/1994 | Avôt et al. ..................... 47/72 |
| 5,350,240 A | 9/1994 | Billman et al. ............. 383/104 |
| 5,353,575 A | 10/1994 | Stepanek ..................... 53/461 |
| 5,361,482 A | 11/1994 | Weder et al. ................. 29/469 |
| 5,388,695 A | 2/1995 | Gilbert ....................... 206/423 |
| 5,428,939 A | 7/1995 | Weder et al. ................. 53/397 |
| 5,443,670 A | 8/1995 | Landau ....................... 156/191 |
| 5,493,809 A | 2/1996 | Weder et al. ................... 47/72 |
| D368,025 S | 3/1996 | Sekerak et al. .............. D9/305 |
| 5,496,251 A | 3/1996 | Cheng ........................ 493/224 |
| 5,496,252 A | 3/1996 | Gilbert ....................... 493/224 |
| 5,526,932 A | 6/1996 | Weder ........................ 206/423 |
| 5,551,570 A | 9/1996 | Shaffer et al. .............. 206/575 |
| 5,572,849 A | 11/1996 | Weder et al. ................. 53/399 |
| 5,572,851 A | 11/1996 | Weder ......................... 53/399 |
| 5,617,703 A | 4/1997 | Weder ......................... 53/413 |
| 5,624,320 A | 4/1997 | Martinez ..................... 472/51 |
| 5,625,979 A | 5/1997 | Weder |
| 5,626,003 A | 5/1997 | Weder ......................... 53/412 |
| 5,647,168 A | 7/1997 | Gilbert ......................... 47/72 |
| 5,647,193 A | 7/1997 | Weder et al. ................. 53/465 |
| 5,715,944 A | 2/1998 | Windisch |
| 5,749,171 A | 5/1998 | Weder .......................... 47/72 |
| D404,684 S | 1/1999 | Shea ......................... D11/164 |
| 5,906,086 A | 5/1999 | Weder ......................... 53/412 |
| 5,974,730 A | 11/1999 | Chien ...................... 47/41.01 |
| D419,436 S | 1/2000 | Celtorius et al. ............. D9/305 |
| 6,098,336 A | 8/2000 | Ferguson .................... 206/423 |
| 6,105,310 A | 8/2000 | Weder .......................... 47/72 |
| 6,129,208 A | 10/2000 | Ferguson .................... 206/423 |
| 6,129,209 A | 10/2000 | Tchira ........................ 206/423 |
| 6,151,830 A | 11/2000 | Weder .......................... 47/72 |
| 6,343,456 B2 * | 2/2002 | Weder ......................... 53/397 |

FOREIGN PATENT DOCUMENTS

| | | |
|---|---|---|
| DE | 3829281 | 5/1989 |
| DE | 3911847 | 10/1990 |
| EP | 0050990 | 5/1982 |
| EP | 0585579 | 3/1994 |
| EP | 0791543 | 8/1997 |
| FR | 1376047 | 9/1964 |
| FR | 2036163 | 12/1970 |
| FR | 2137325 | 12/1972 |
| FR | 2272914 | 12/1975 |
| FR | 2489126 | 3/1982 |
| FR | 2567068 | 1/1986 |
| FR | 2610604 | 8/1988 |
| FR | 2603159 | 3/1989 |
| FR | 2619698 | 3/1989 |
| GB | 5605 | 5/1885 |
| GB | 1204647 | 9/1970 |
| GB | 2056410 | 3/1981 |
| GB | 2074542 | 11/1981 |
| GB | 2128083 | 4/1984 |
| GB | 2203127 | 10/1988 |
| GB | 2212136 | 7/1989 |
| GB | 2252708 | 8/1992 |
| IT | 224507 | 4/1996 |
| JP | 542958 | 2/1993 |
| JP | 6127555 | 5/1994 |
| JP | 819334 | 1/1996 |
| NL | 8301709 | 12/1984 |
| NL | 1000658 | 1/1996 |
| WO | 9315979 | 8/1993 |
| WO | 9712819 | 4/1997 |

OTHER PUBLICATIONS

"Super Seller", Supermarket Floral, Sep. 15, 1992.
"Halloween", Link Magazine, Sep. 1992.
"Now More Than Ever", Supermarket Floral, Sep. 15, 1992.
Le Plant Sac Advertisement, published prior to Sep. 26, 1987.
"A World of Cut Flower and Pot Plant Packaging" Brochure, Klerk's Plastic Products Manufacturing, Inc., published prior to Mar. 31, 1994, 6 pages.
Chantler & Chantler brochure showing Zipper Sleeve™ and Florasheet®, published prior to Mar. 31, 1994, 2 pages.
"Stand Alone Plastic Bagmaking" brochure, AMI, Atlanta, GA, Feb. 15, 1996, 2 pages.
"Foil Jackets" brochure, Custom Medallion, Inc., Dec., 1996, 2 pages.
"Derwent Abstract" FR 2610604A. It is noted that the abstract is an incorrect English translation of the contents of the French patent. The French patent does not enable or disclose adhesively attaching the covering to the container. 1988.
"Silver Linings" Brochure, Affinity Diversified Industries, Inc., 1986. The Silver Lingings brochure shows a floral sleeve with a closed bottom. The brochure shows , in one embodiment, a vase with flowers inside a "cut flower" sleeve with the sleeve tied with a ribbon about the neck of the vase.
"Special Occasion Printed Highlophane Bags" Brochure, Highland Supply Corporation, 1990, 2 pages.
"Creative Packaging" Brochure, John Henry Company, Sept. 1992.
"Make Highlander Your Headquarters" Brochure, Highland Supply Corporation, 1991.

* cited by examiner

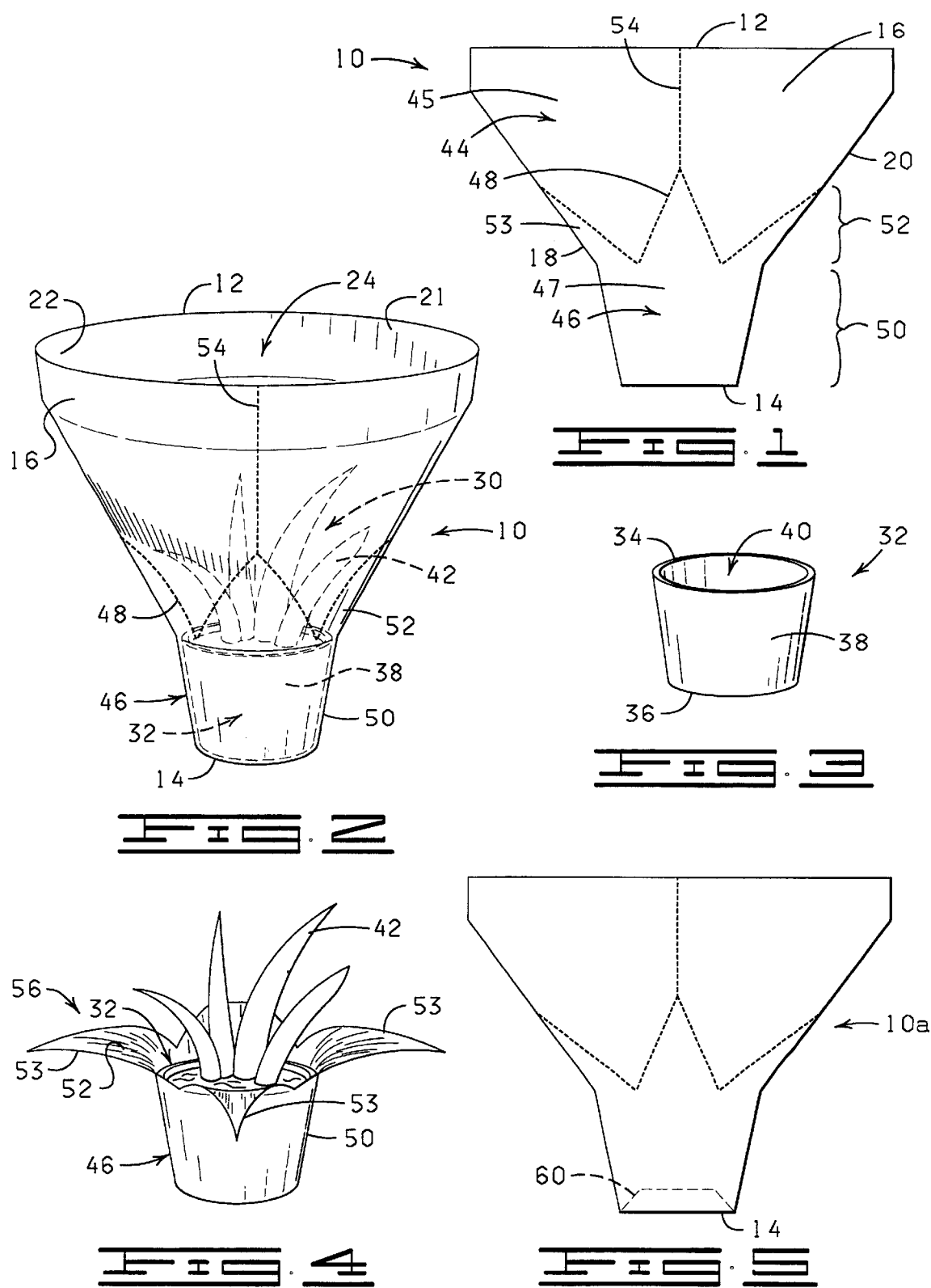

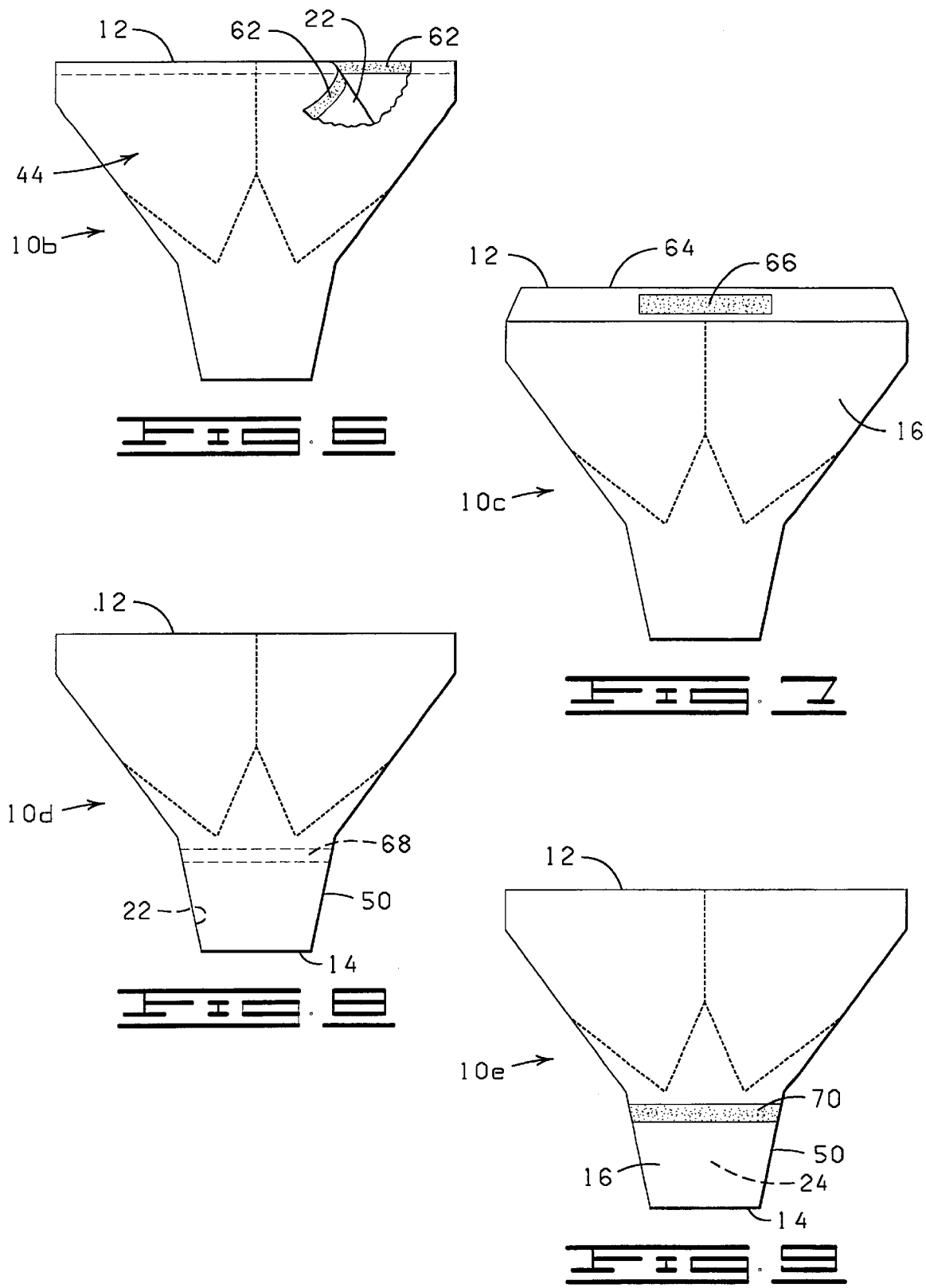

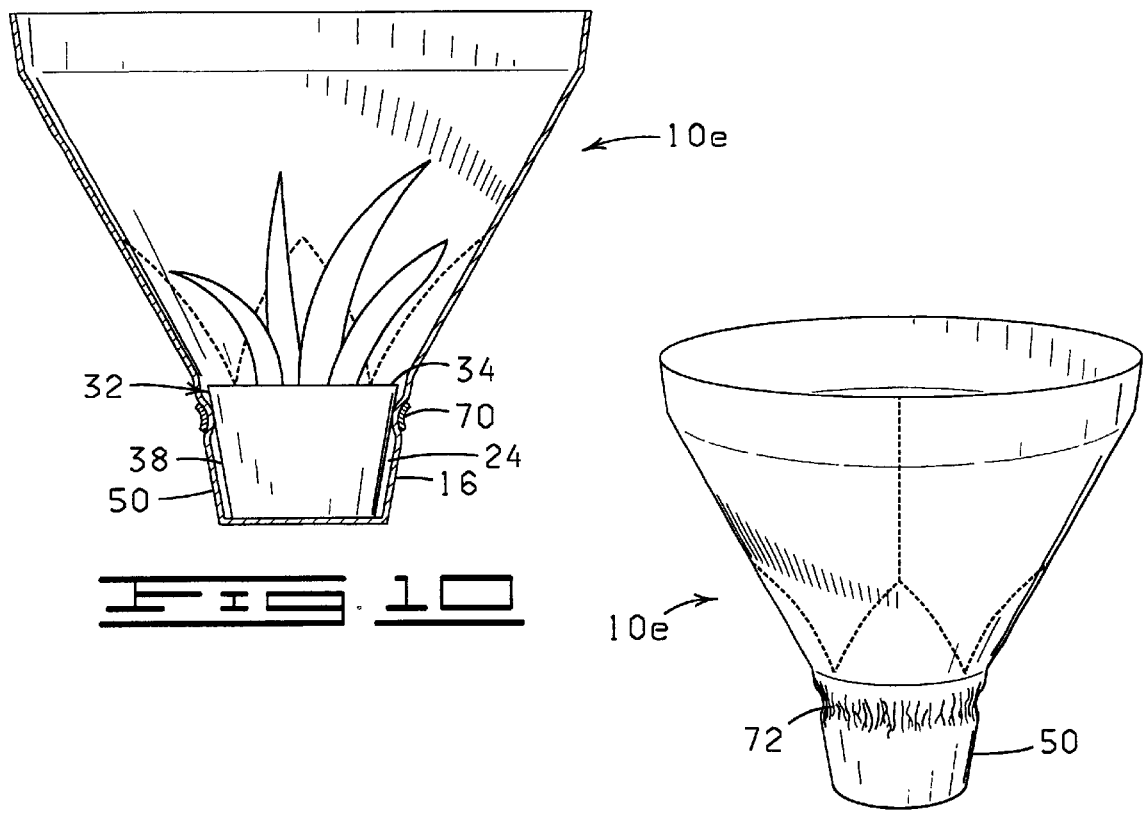
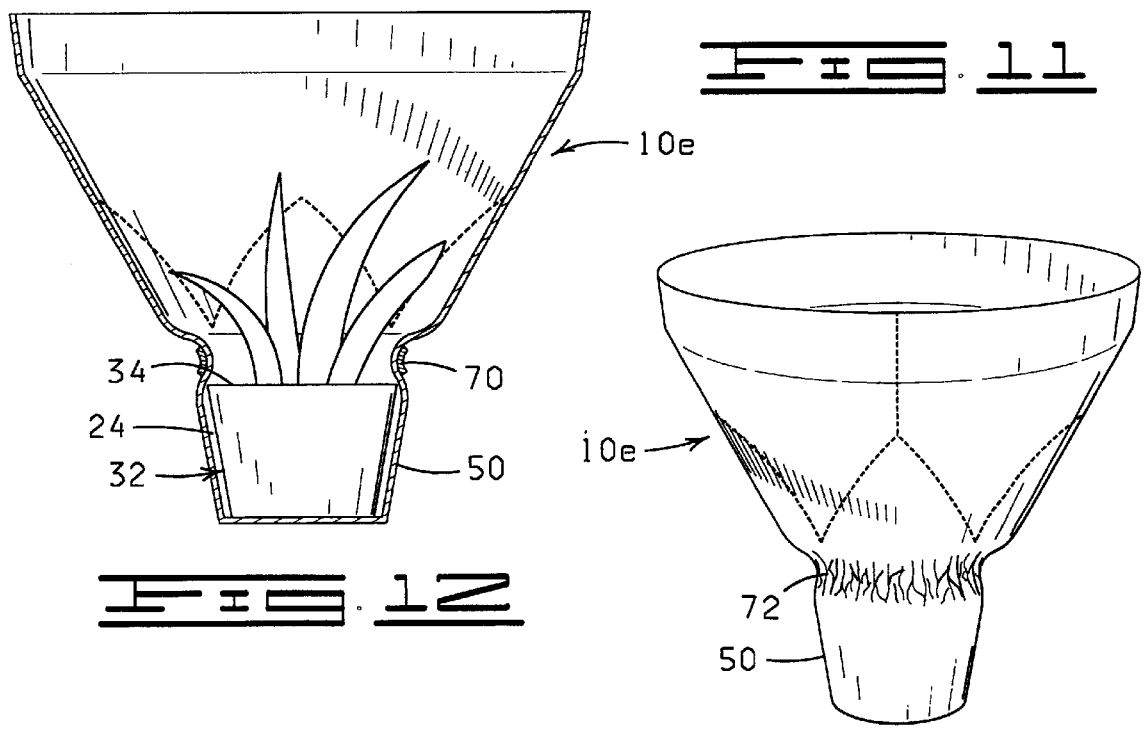

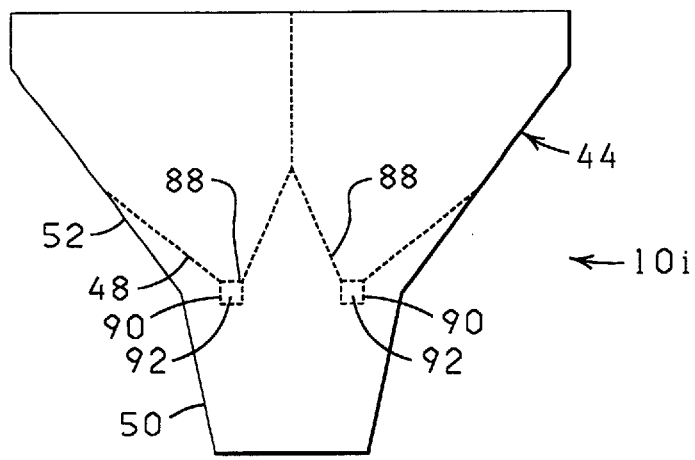
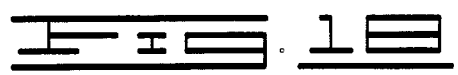
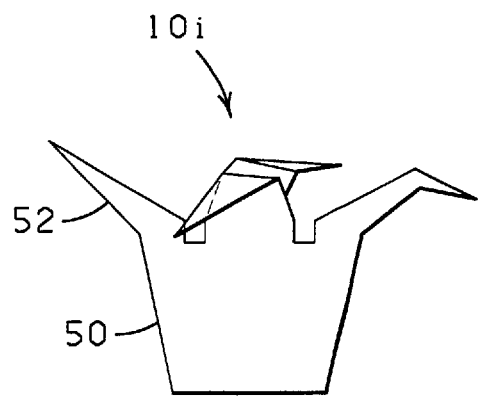
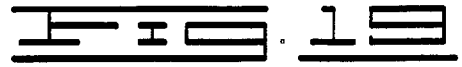
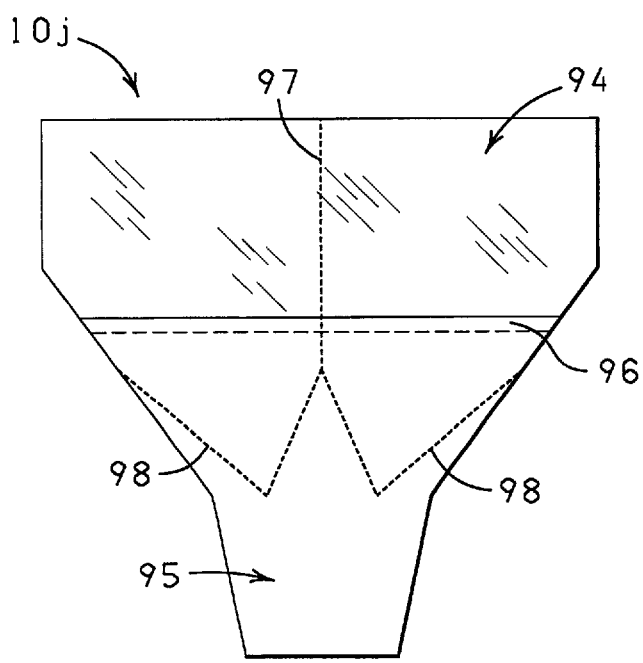

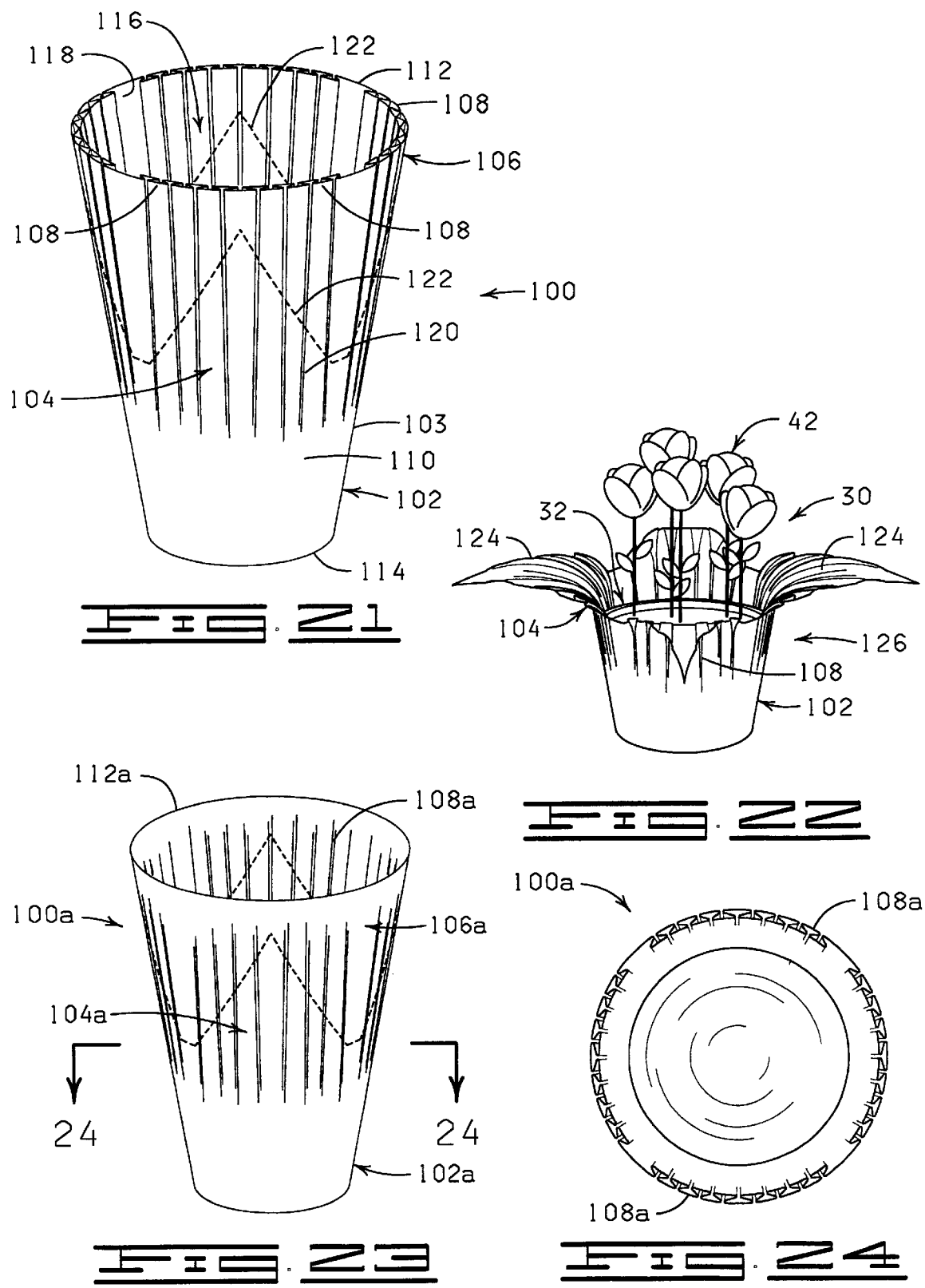

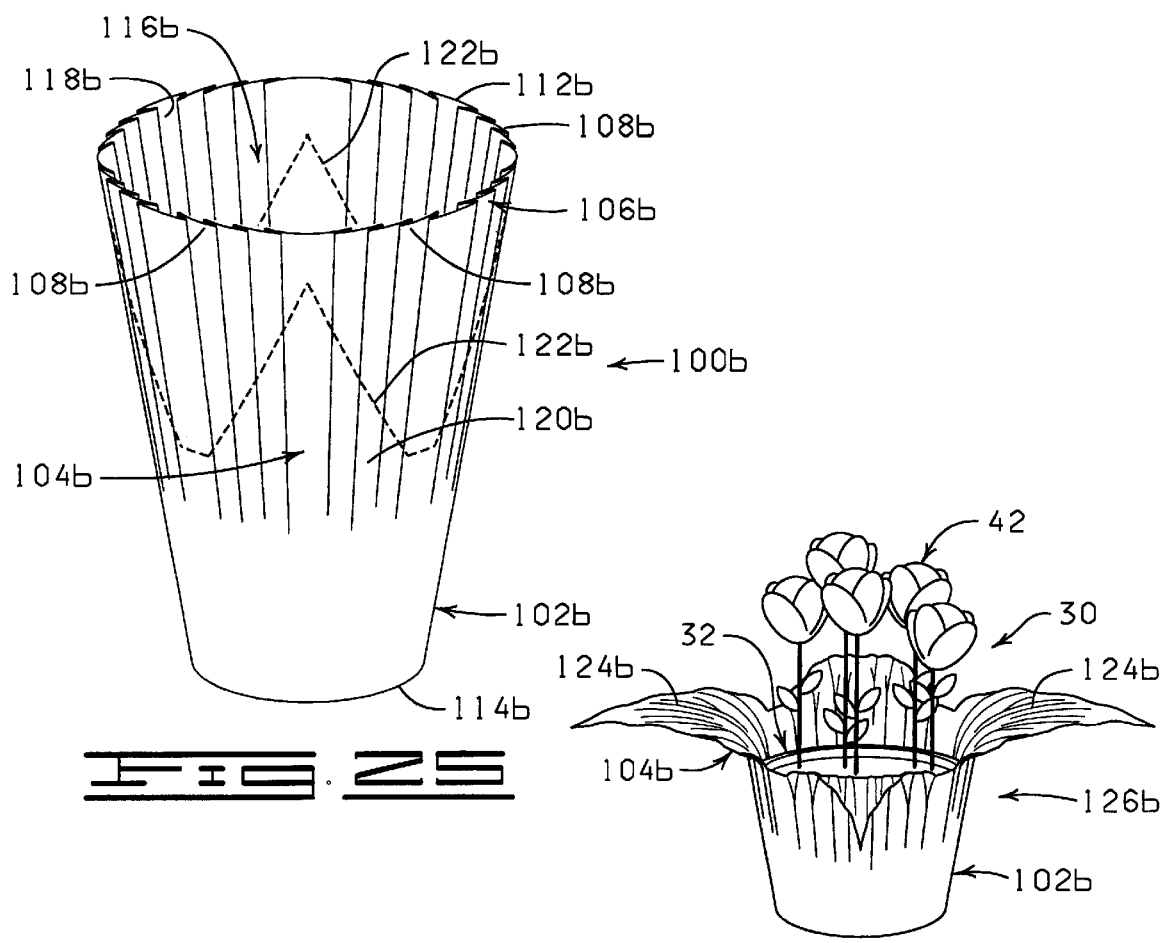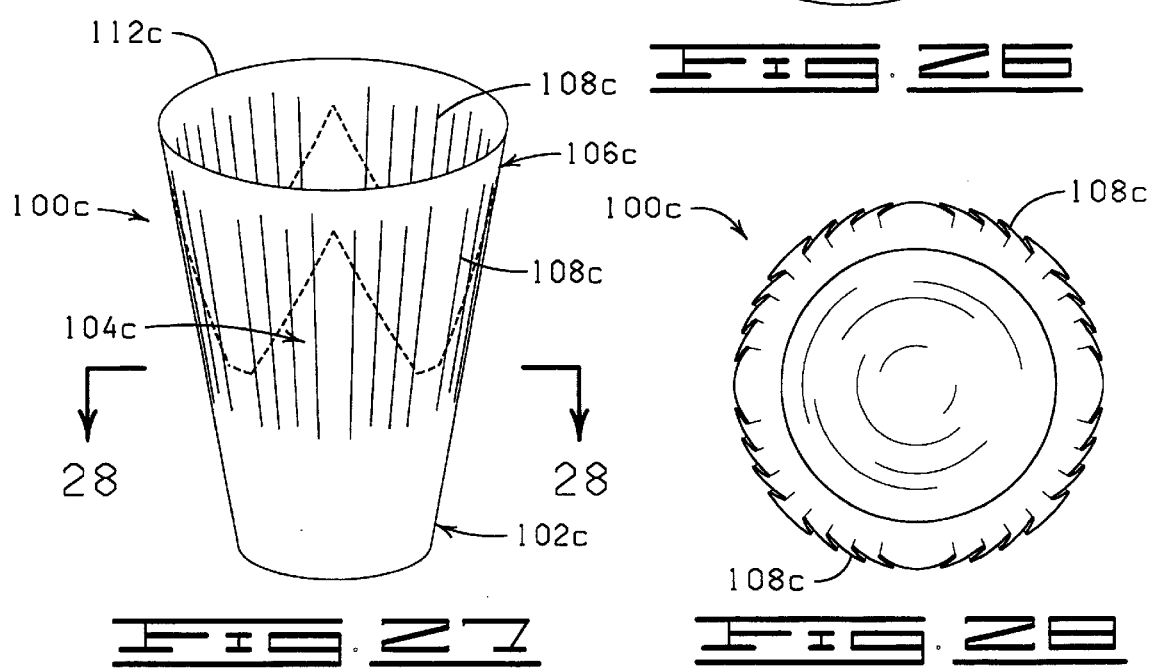

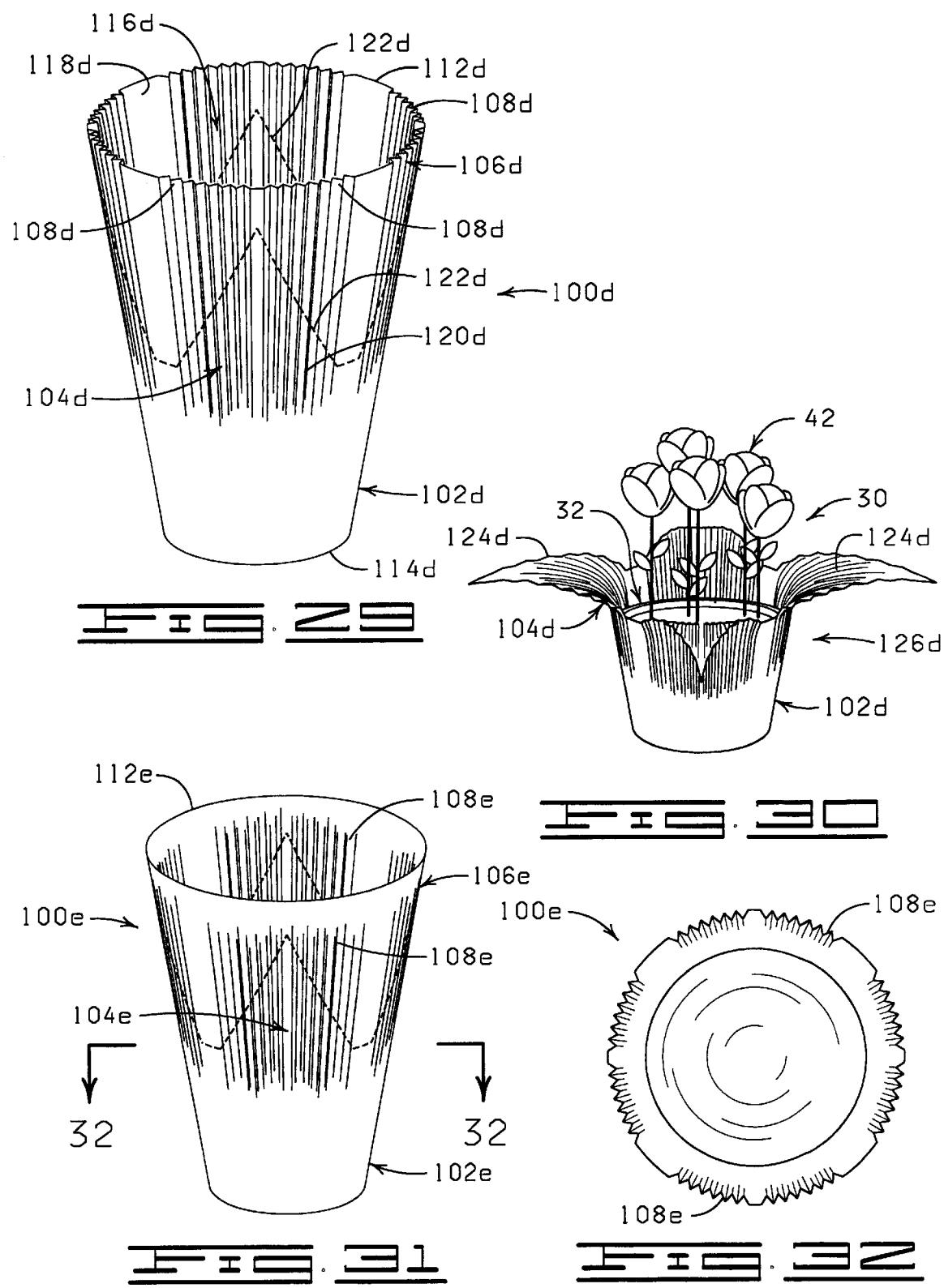

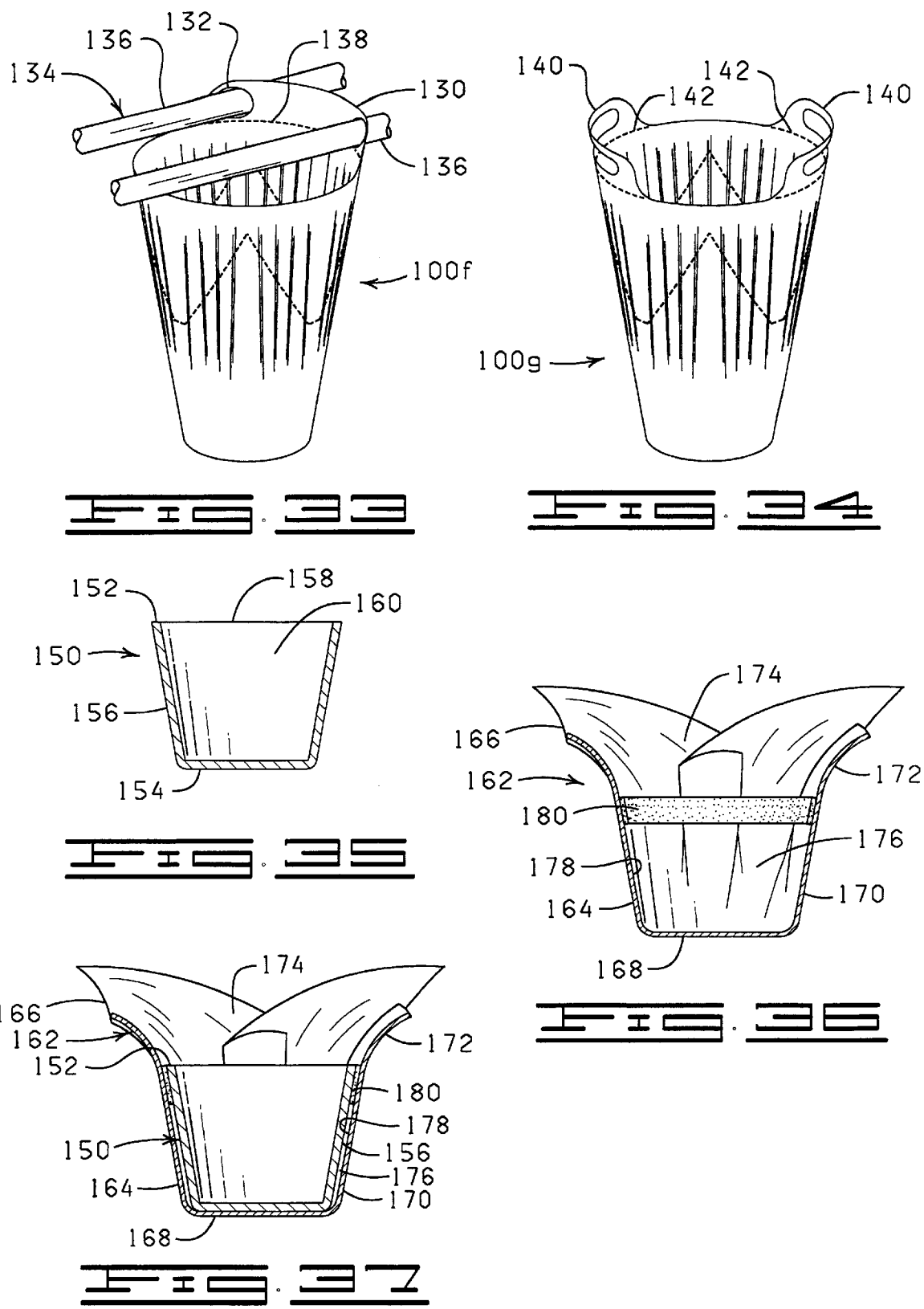

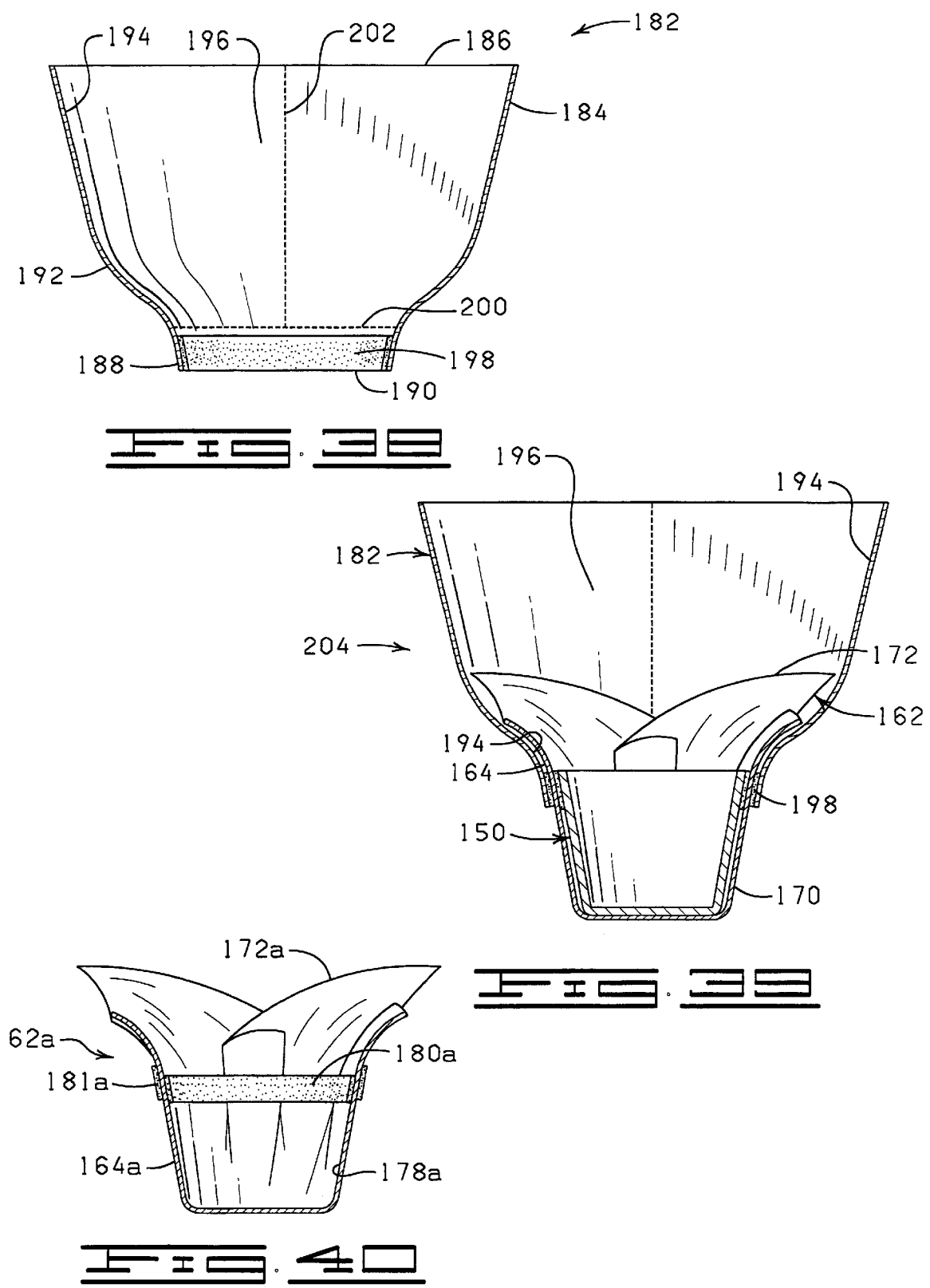

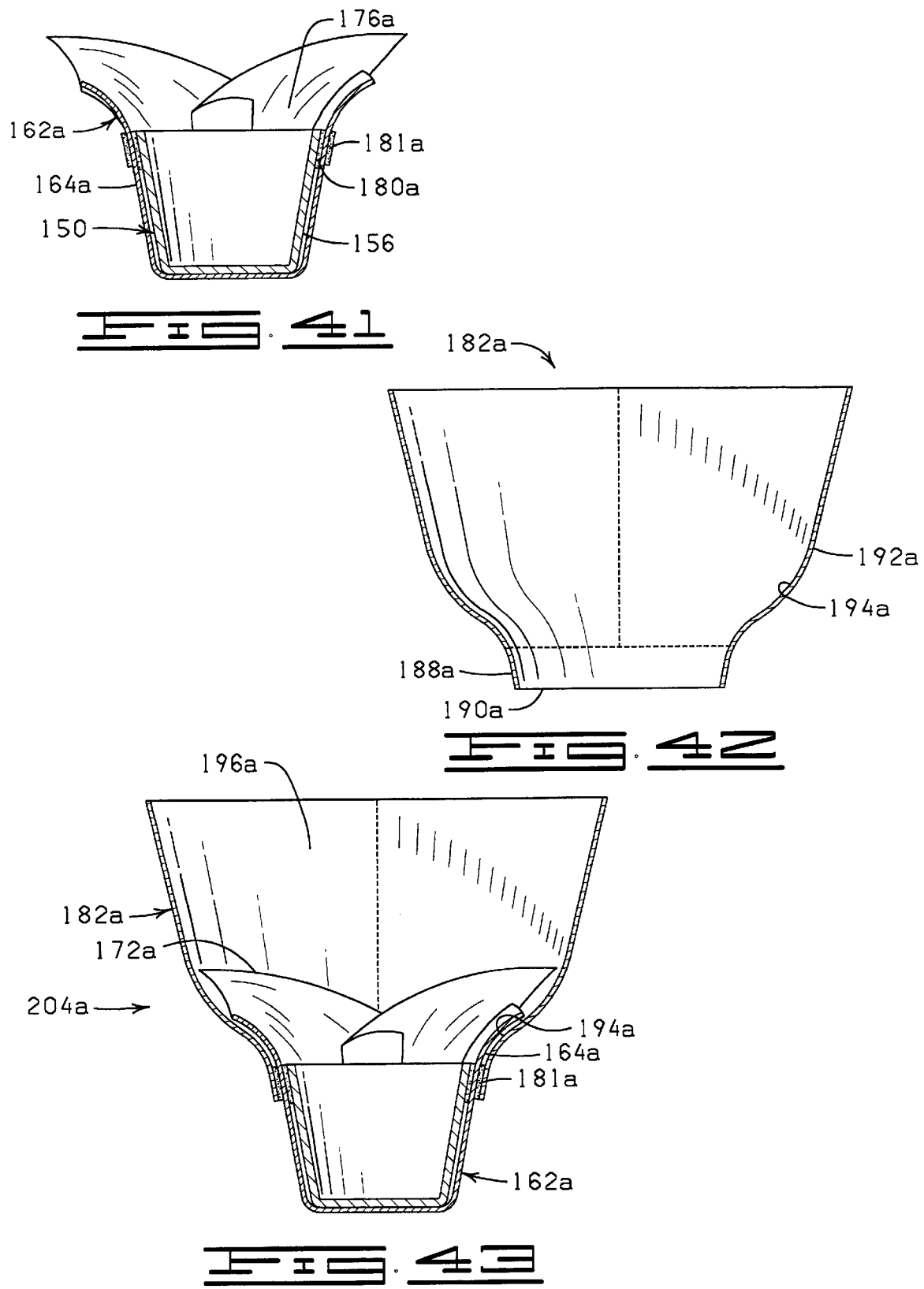

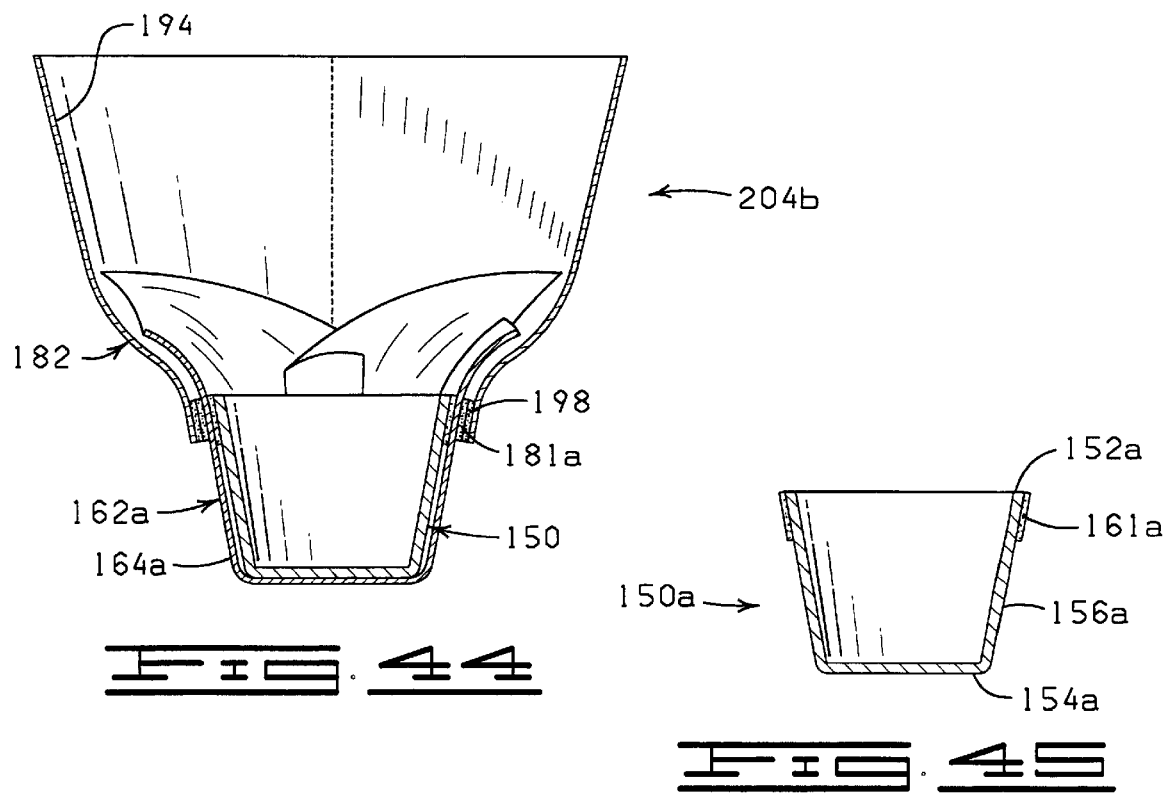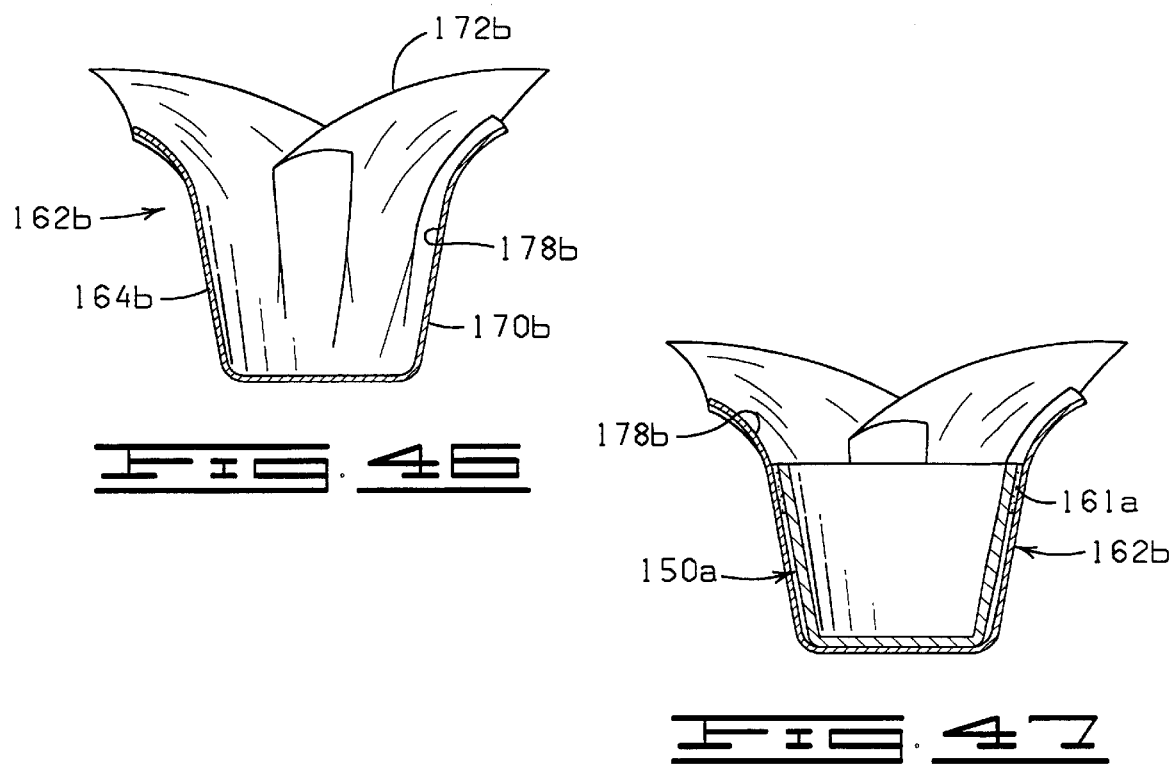

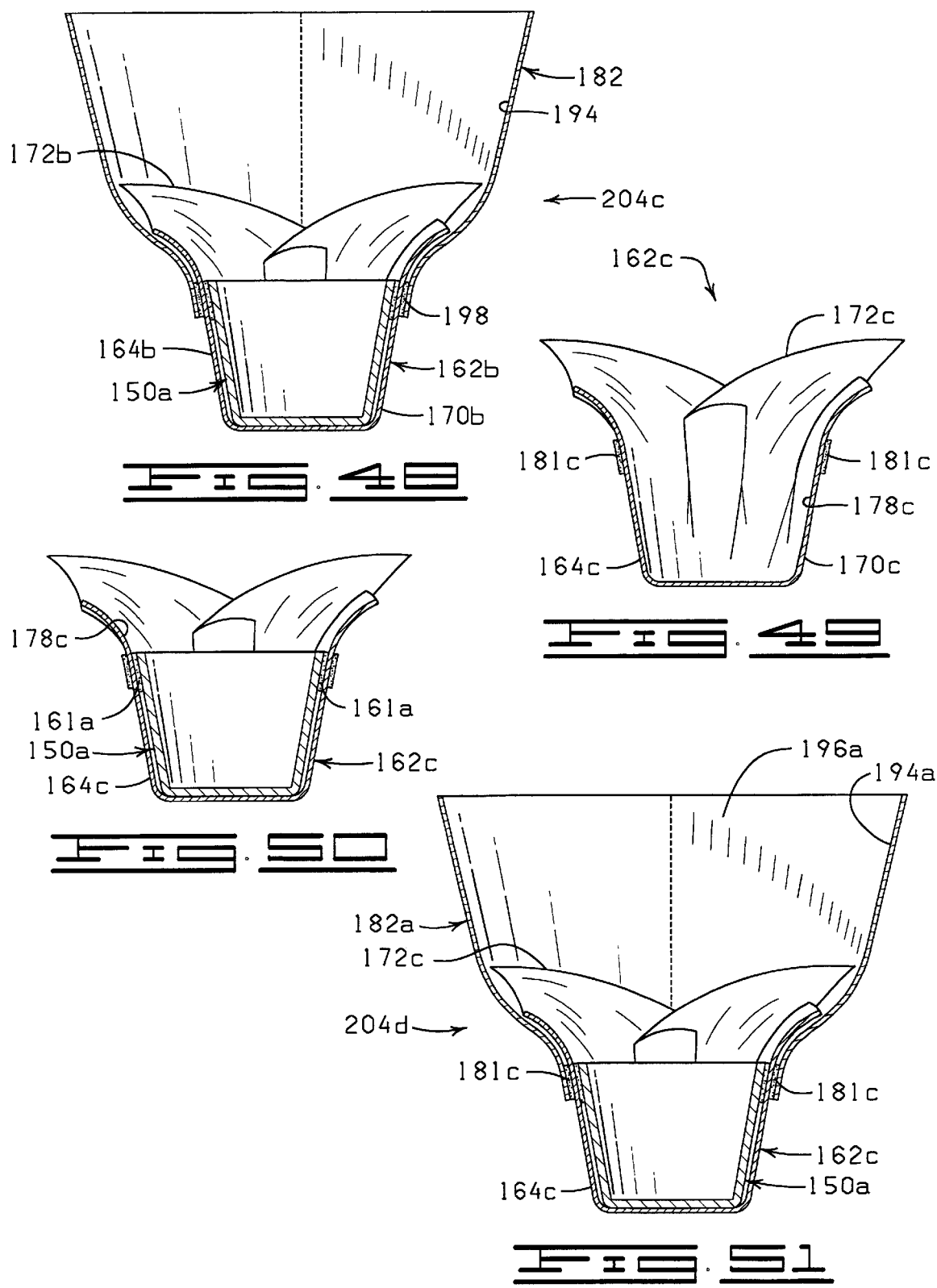

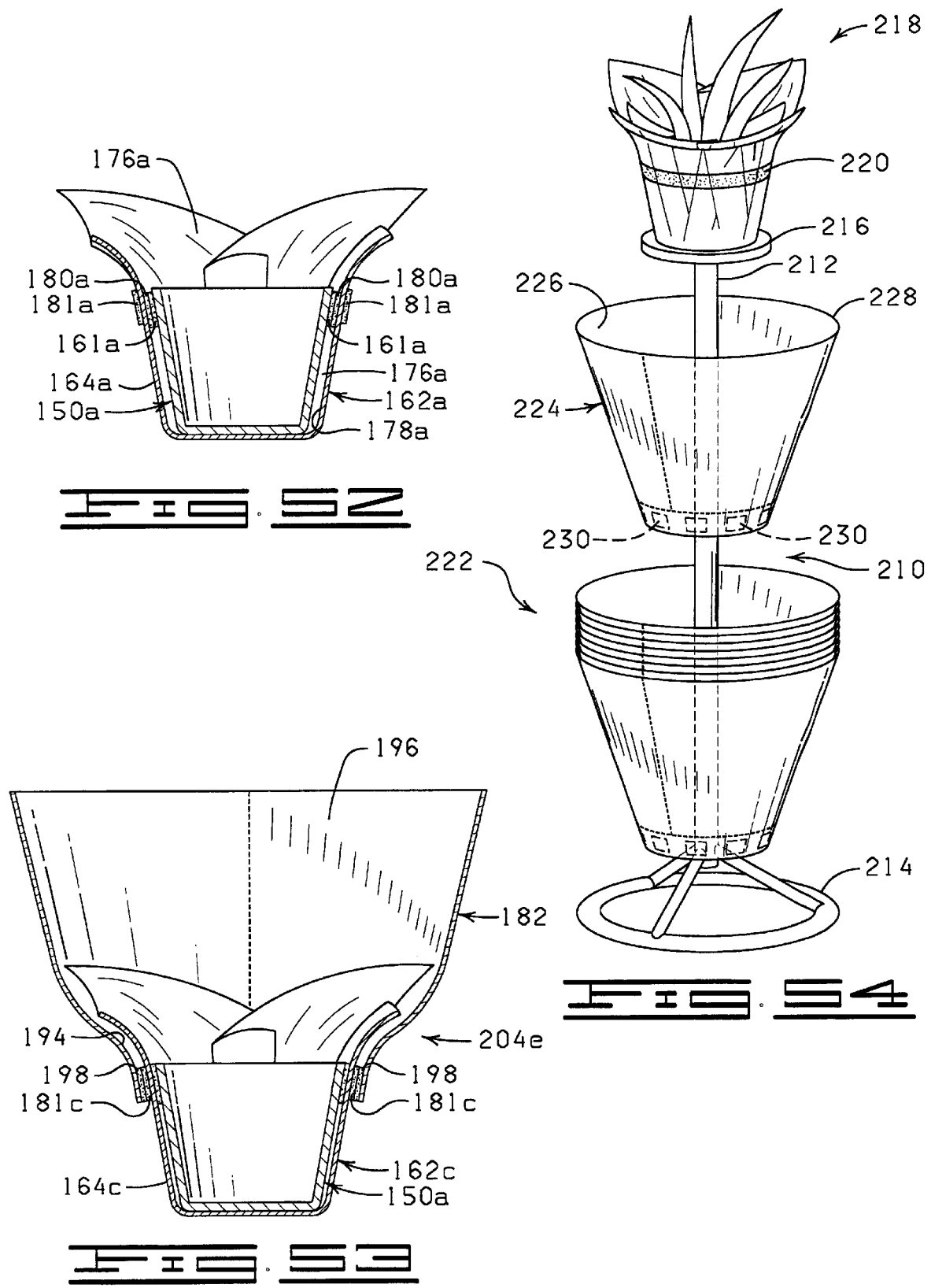

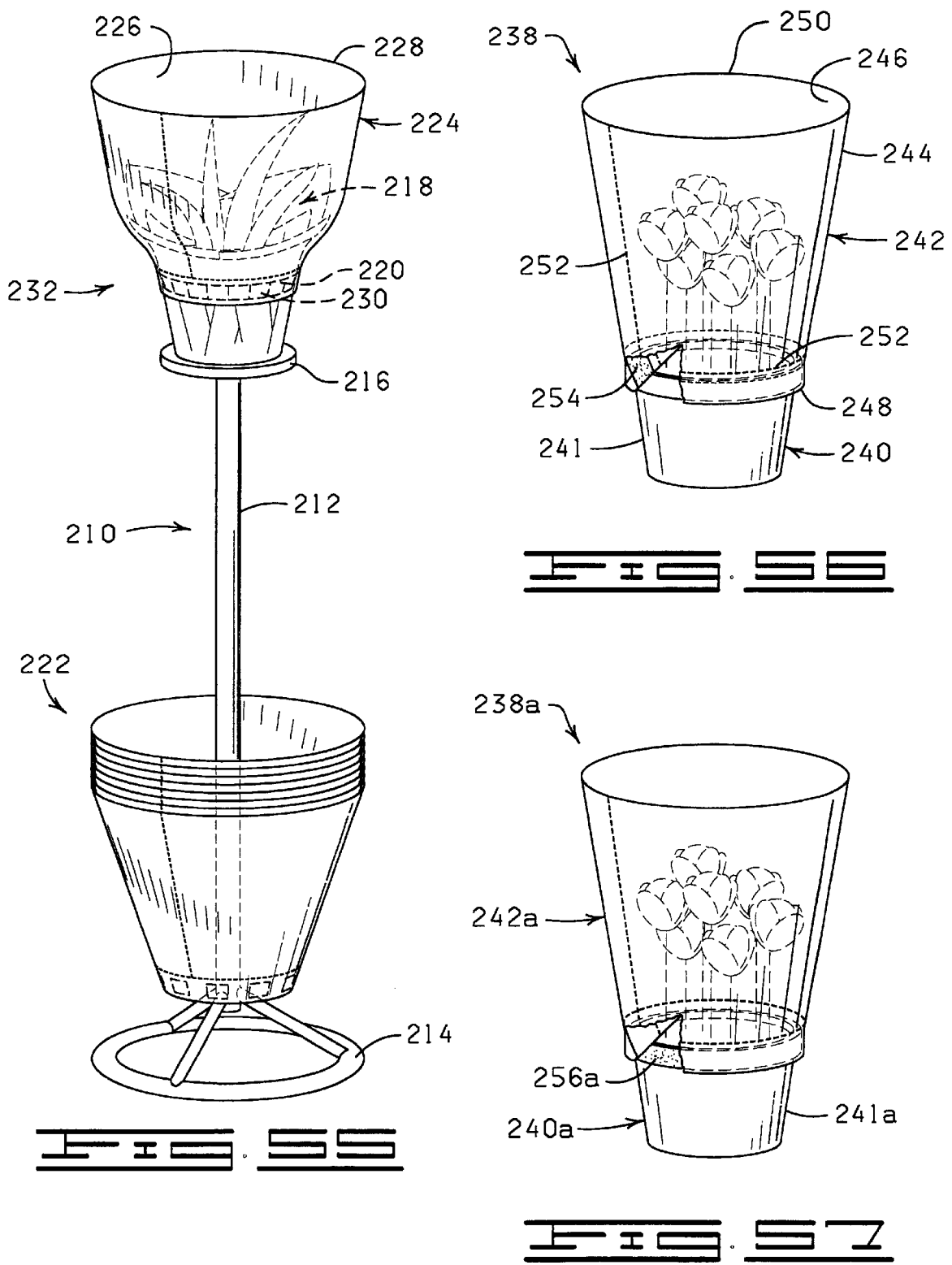

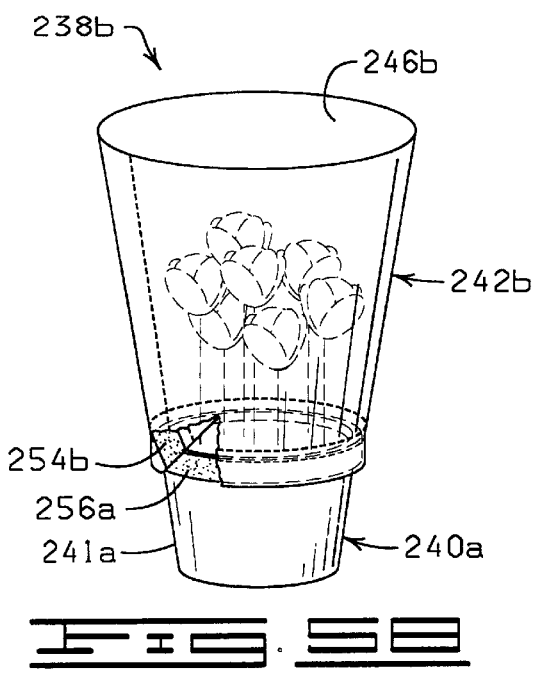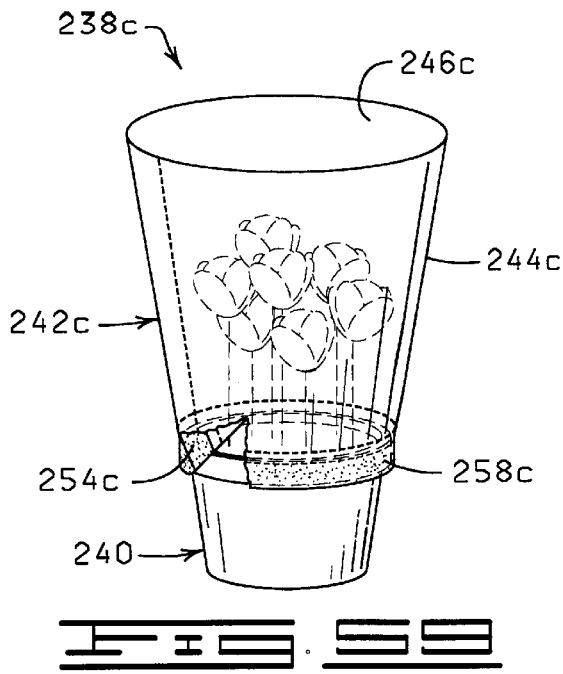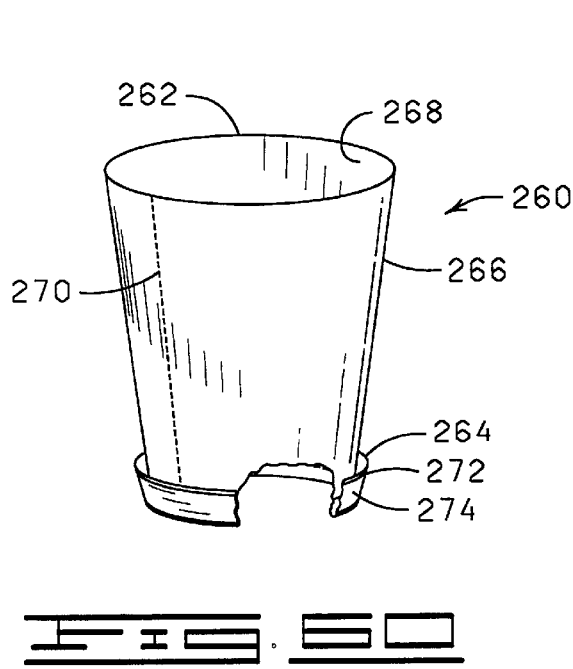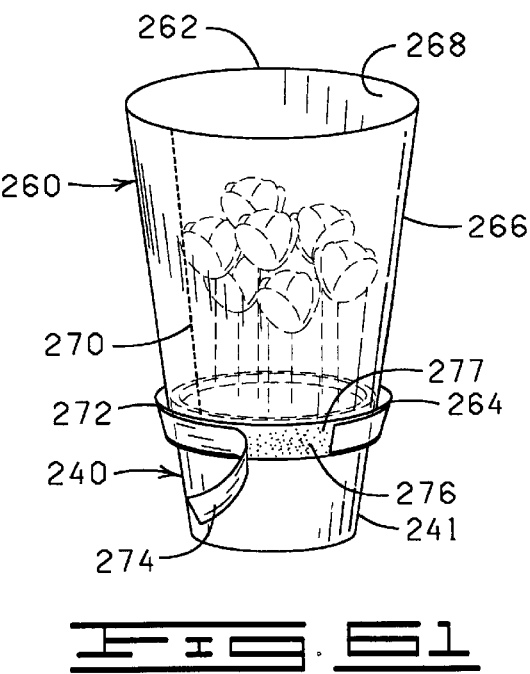

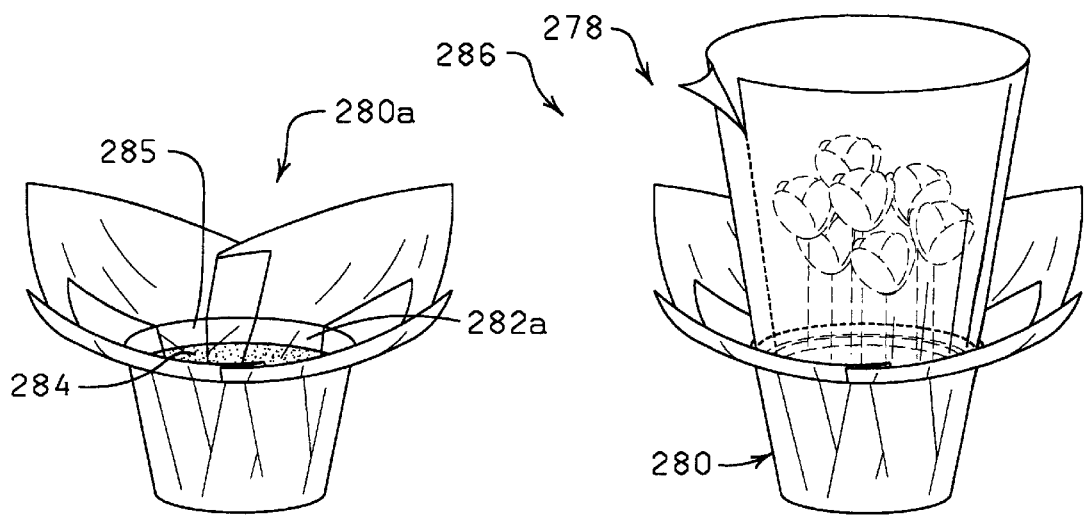
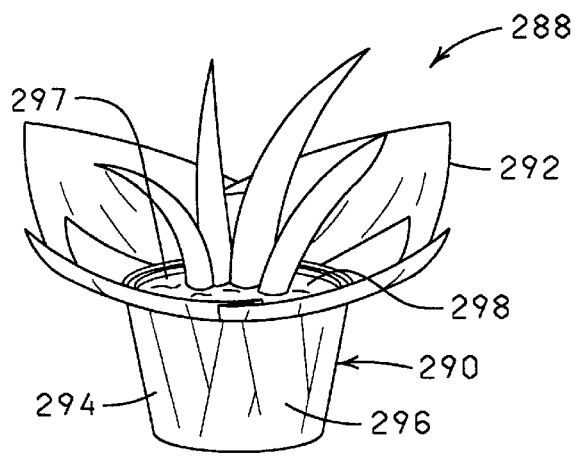
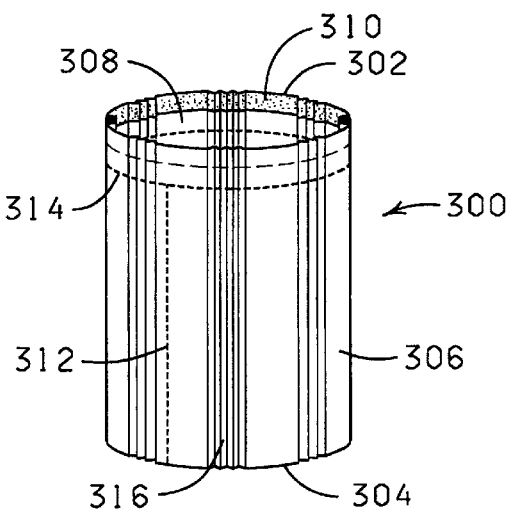

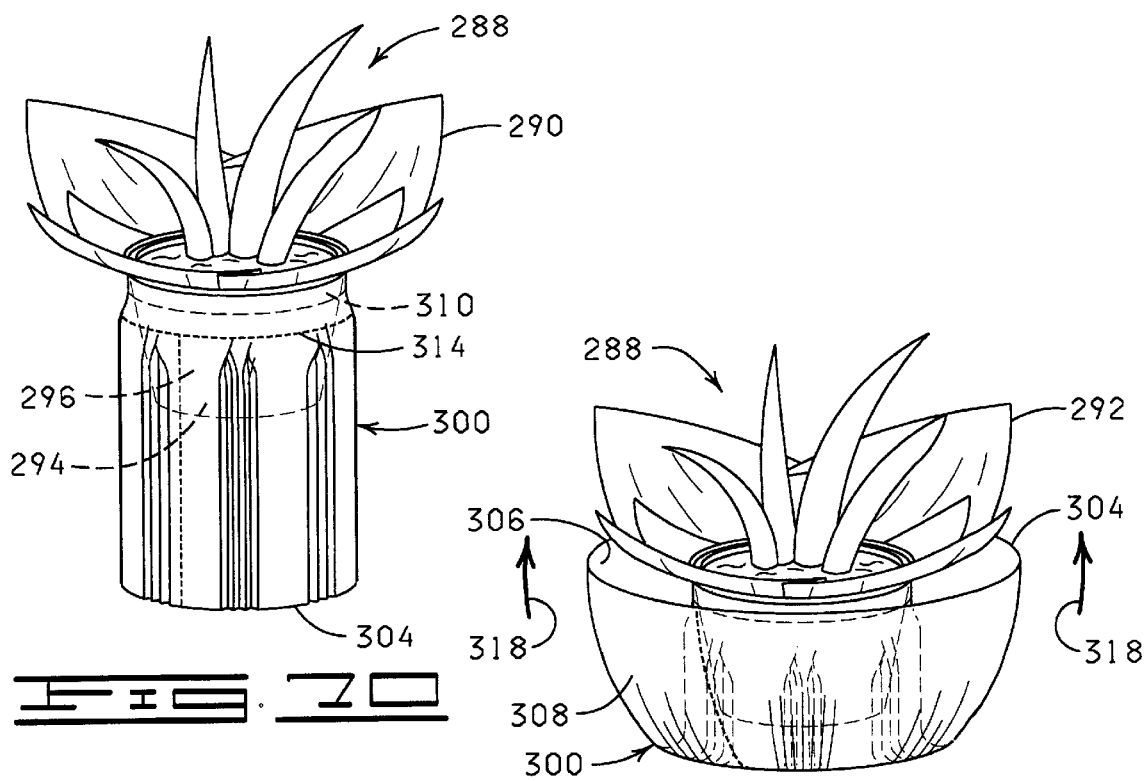
Fig. 70
Fig. 71
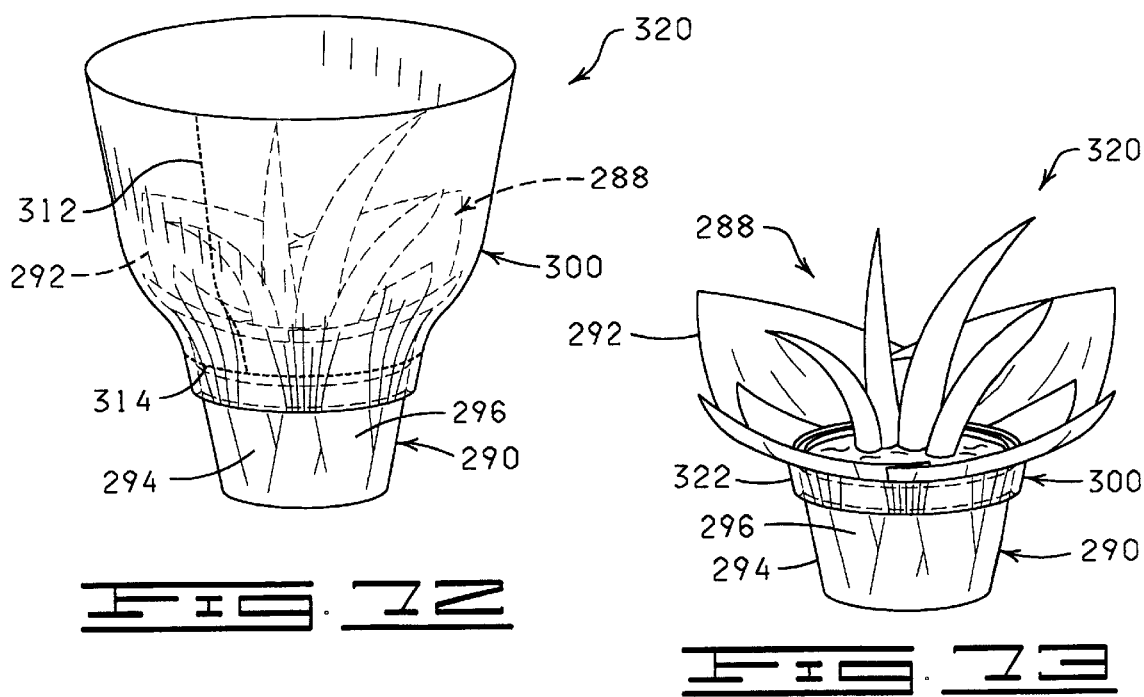
Fig. 72
Fig. 73

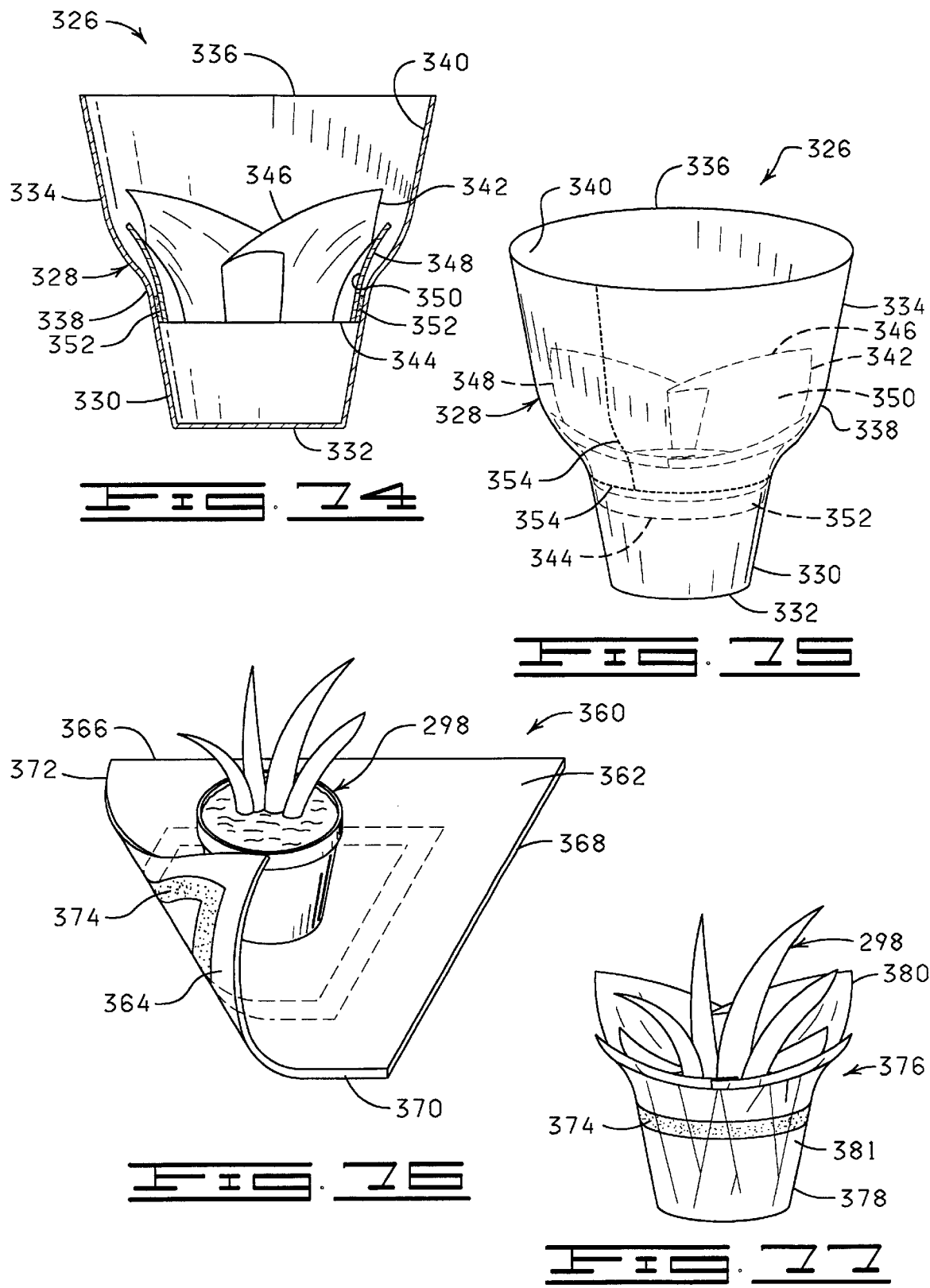

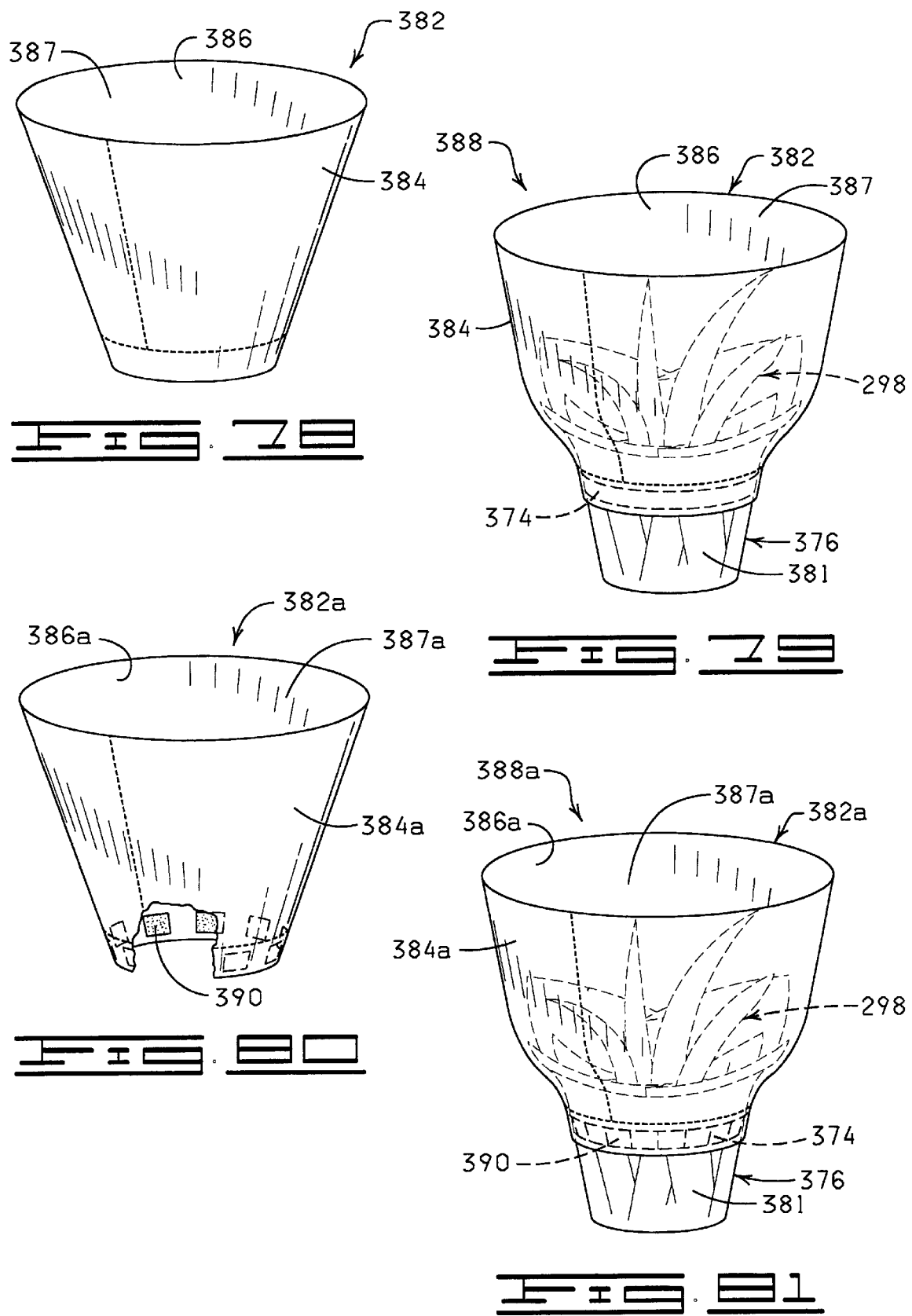

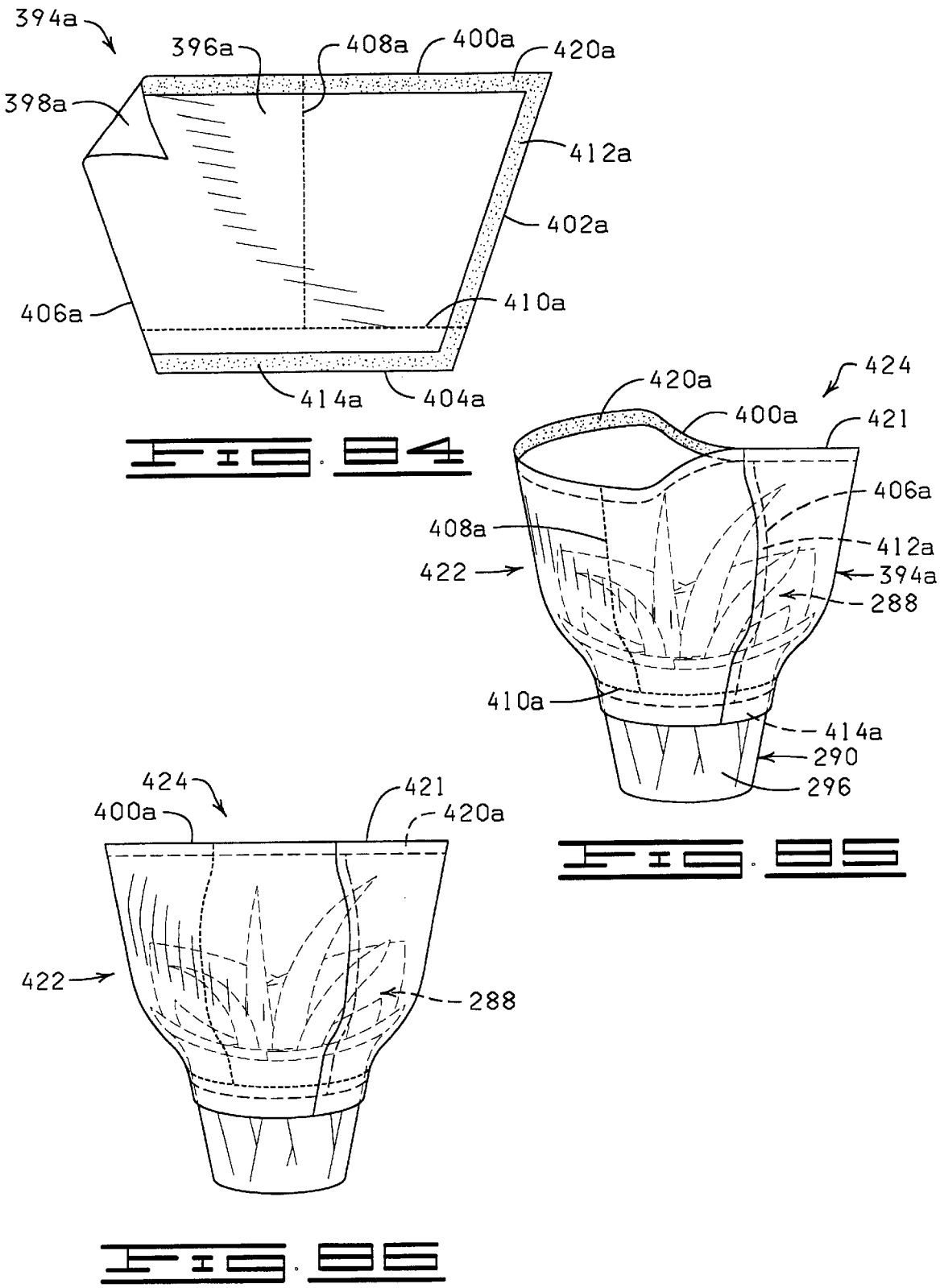

METHOD OF SECURING A PLANT COVER ABOUT A POT

CROSS REFERENCE TO RELATED APPLICATIONS

The present application is a continuation of Ser. No. 09/895,302, filed Jun. 29, 2001, now U.S. Pat. No. 6,343,456, which is a continuation of U.S. Ser. No. 09/636,375, filed Jul. 26, 2000 now abandoned; which is a continuation of U.S. Ser. No. 09/366,630, filed Aug. 3, 1999, U.S. Pat. No. 6,192,657; which is a continuation of U.S. Ser. No. 09/025,090, filed Feb. 17, 1998, now U.S. Pat. No. 5,930,979; which is a continuation of U.S. Ser. No. 08/775,816, filed Jan. 2, 1997, now U.S. Pat. No. 5,740,658; which is a continuation of U.S. Ser. No. 08/460,180, filed Jun. 2, 1995, now U.S. Pat. No. 5,617,703; which is a continuation of U.S. Ser. No. 08/237,078, filed May 3, 1994, now U.S. Pat. No. 5,625,979, issued on May 6, 1997, which is a continuation-in-part of U.S. Ser. No. 08/220,852, filed Mar. 31, 1994, now U.S. Pat. No. 5,572,851.

FIELD OF THE INVENTION

This invention generally relates to sleeves, and, more particularly, to sleeves used to wrap flower pots containing floral groupings and/or mediums containing floral groupings, and methods of using same.

BRIEF DESCRIPTION OF THE DRAWINGS

FIG. 1 is an elevational view of a sleeve having a detaching element constructed in accordance with the present invention.

FIG. 2 is a perspective view of the sleeve of FIG. 1 having a potted plant disposed therein.

FIG. 3 is a perspective view of a pot such as might be used with the sleeve of the present invention.

FIG. 4 is a perspective view of the potted plant disposed in the sleeve of FIG. 2 after an upper portion of the sleeve has been removed to provide a pot cover having a skirt.

FIG. 5 is an elevational view of a version of the sleeve of FIG. 1 with a gusseted bottom.

FIG. 6 is a partial cutaway, elevational view of an alternate version of the sleeve of FIG. 1 wherein a bonding material is disposed upon an upper end of the sleeve.

FIG. 7 is an elevational view of an alternate version of the sleeve of FIG. 1 having a folding flap.

FIG. 8 is an elevational view of an alternate version of the sleeve of FIG. 1 having a bonding material disposed on a portion of an inner surface of the sleeve.

FIG. 9 is an elevational view of an alternate version of the sleeve of FIG. 1 having a bonding material disposed on a portion of an outer surface of the sleeve.

FIG. 10 is a cross-sectional view showing the sleeve of FIG. 9 crimped about a pot.

FIG. 11 is a perspective view of the crimped sleeve of FIG. 10.

FIG. 12 is a cross-sectional view of the sleeve of FIG. 9 wherein a crimped portion is formed above an upper end of a pot.

FIG. 13 is a perspective view of the crimped sleeve of FIG. 12 wherein a crimped portion is formed above a pot.

FIG. 18 is an elevational view of another version of the sleeve of FIG. 1 having notched perforated areas for enhancing extension of a skirt portion of the sleeve after detachment of an upper portion of the sleeve.

FIG. 19 is a an elevational view of the sleeve of FIG. 18 after the upper sleeve portion has been removed.

FIG. 20 is an elevational view of an alternate version of a sleeve of the present invention wherein an upper portion of the sleeve is constructed of a different material than a lower portion of the sleeve.

FIG. 21 is a perspective view of a version of a sleeve of the present invention wherein the sleeve comprises expansion elements for enhancing extension of a skirt portion once an upper portion is removed.

FIG. 22 is a perspective view of the sleeve of FIG. 21 after the upper portion has been removed and the skirt portion is extended.

FIG. 23 is a perspective view of a sleeve similar to the sleeve of FIG. 21 except the expansion elements do not extend completely to an upper end of the sleeve.

FIG. 24 is a cross-sectional view of the sleeve of FIG. 23 taken along line 24—24 thereof.

FIG. 25 is a perspective view of another version of a sleeve of the present invention wherein the sleeve comprises z-shaped expansion elements for enhancing extension of a skirt portion.

FIG. 26 is a perspective view of the sleeve of FIG. 25 after an upper portion has been removed to reveal the skirt portion.

FIG. 27 is a perspective view of a sleeve similar to the sleeve of FIG. 25 except the z-shaped expansion elements do not extend completely to an upper end of the sleeve.

FIG. 28 is a cross-sectional view of the sleeve of FIG. 27 taken along line 28—28 thereof.

FIG. 29 is a perspective view of a version of a sleeve of the present invention wherein the sleeve comprises fluted or groove-shaped expansion elements for enhancing extension of a skirt portion.

FIG. 30 is a perspective view of the sleeve of FIG. 29 after an upper portion has been removed to reveal the skirt portion.

FIG. 31 is a perspective view of a sleeve similar to the sleeve of FIG. 29 except the fluted or groove-shaped expansion elements do not extend completely to an upper end of the sleeve.

FIG. 32 is a cross-sectional view of the sleeve of FIG. 31 taken along line 32—32 thereof.

FIG. 33 is a perspective view of a sleeve which is exactly the same as the sleeve of FIG. 23 except it has a support extension on the upper end.

FIG. 34 is a perspective view of a sleeve which is exactly the same as FIG. 23 except it has handles on the upper end.

FIG. 35 is a cross-sectional view of a pot used in accordance with the present invention.

FIG. 36 is a cross-sectional view of a pot cover having a bonding material on a portion of its inner surface.

FIG. 37 is a cross-sectional view of the pot of FIG. 35 disposed in the pot cover of FIG. 36 showing the connection of the pot to an inner surface of the pot cover.

FIG. 38 is a cross-sectional view of a sleeve having an open lower end and having a bonding material on a portion of an inner surface near a lower end.

FIG. 39 is a cross-sectional view of the pot and cover of FIG. 37 disposed within the sleeve of FIG. 38 wherein a portion of an outer surface of the pot cover is connected to the sleeve.

FIG. 40 is a cross-sectional view of a pot cover having a bonding material on both a portion of an inner surface and on a portion of an outer surface of the pot cover.

FIG. 41 is a cross-sectional view of the pot cover of FIG. 40 having disposed therein the pot of FIG. 35 wherein the pot is connected to the inner surface of the pot cover by the bonding material on the inner surface of the pot cover.

FIG. 42 is a cross-sectional view of a sleeve having an open lower end similar to the sleeve of FIG. 38 except having no bonding material on an inner surface.

FIG. 43 is a cross-sectional view of the pot cover and pot of FIG. 41 disposed in the sleeve of FIG. 42 wherein an outer surface of the pot cover is connected to the inner surface of the sleeve via bonding material on the outer surface of the pot cover.

FIG. 44 is a cross-sectional view of a pot cover and pot such as that shown in FIG. 41 disposed in the sleeve of FIG. 38 wherein the bonding material of the pot cover engages the bonding material on the sleeve.

FIG. 45 is a cross-sectional view of a pot having a bonding material on a portion of an outer surface thereof.

FIG. 46 is a cross-sectional view of a preformed pot cover having no bonding material thereon.

FIG. 47 is a cross-sectional view of the pot of FIG. 45 disposed within the preformed pot cover of FIG. 46 wherein the cover and pot are connected via the bonding material on the pot.

FIG. 48 is a cross-sectional view of the pot and preformed pot cover of FIG. 47 disposed within the sleeve of FIG. 38 wherein the preformed pot cover is connected to the sleeve via bonding material on the inner surface of the sleeve.

FIG. 49 is a cross-sectional view of a preformed pot cover having bonding material on a portion of an outer surface thereof.

FIG. 50 is a cross-sectional view of the pot of FIG. 45 disposed within the pot cover of FIG. 49 wherein the pot is connected to an inner surface of the pot cover via bonding material on the pot.

FIG. 51 is a cross-sectional view of the pot cover and pot of FIG. 50 disposed within the sleeve of FIG. 42 wherein the bonding material on the outer surface of the pot cover bonds to a portion of the inner surface of the sleeve.

FIG. 56 is a perspective view of a plant package constructed in accordance with the present invention showing a sleeve connected to a potted plant via a bonding material on a lower end of the sleeve.

FIG. 57 is a perspective view of a sleeve connected to a potted plant via a bonding material on an upper end of a pot.

FIG. 58 is a perspective view of a plant package having a sleeve connected to a pot wherein a bonding material is on a lower end of the sleeve and on an upper end of the pot.

FIG. 59 is a perspective view of a plant package having a sleeve connected to a pot wherein a bonding material is disposed on an inner surface and an outer surface of a lower end of the sleeve.

FIG. 60 is a partial cutaway, perspective view of a sleeve having an up-turned lower end and having a bonding material disposed upon a portion of the up-turned lower end and wherein the bonding material is covered by a cover or release strip.

FIG. 61 is a perspective view of the sleeve of FIG. 60 disposed about a pot with a portion of the release strip peeled away.

FIG. 62 is a perspective view of the sleeve and pot of FIG. 61 wherein the release strip is completely removed from the bonding material.

FIG. 63 is a perspective view of the sleeve and pot of FIG. 62 wherein the up-turned portion of the sleeve with the bonding material is disposed partially downwardly about the pot.

FIG. 64 is a perspective view of the sleeve and pot of FIG. 63 wherein the lower end of the sleeve is fully connected to the pot and a portion of the sleeve is detached at an upper end of the sleeve.

FIG. 65 is a perspective view of a preformed pot cover.

FIG. 66 is a perspective view of a preformed pot cover like the cover of FIG. 65 but also having a bonding material disposed on a portion of an inner surface thereof.

FIG. 67 is a perspective view of the potted plant and sleeve of FIG. 64 disposed in the preformed pot cover of either FIG. 65 or FIG. 66.

FIG. 68 is a perspective view of a potted plant disposed within a decorative cover.

FIG. 69 is a perspective view of another sleeve constructed in accordance with the present invention having a bonding material on an inner surface of the sleeve near an upper end of the sleeve and having expansion elements disposed within the sleeve.

FIG. 70 is a perspective view of the potted plant of FIG. 68 with the upper end of the sleeve of FIG. 69 connected to the pot cover by the bonding material on the sleeve.

FIG. 71 is a perspective view of the sleeve and potted plant of FIG. 70 wherein a lower end of the sleeve has been pulled upwardly toward an upper end of the pot.

FIG. 72 is a perspective view of the sleeve and potted plant of FIG. 71 after the sleeve has been pulled completely upwardly above the pot.

FIG. 73 is a perspective view of the sleeve and potted plant of FIG. 72 after an upper portion of the sleeve has been detached leaving the lower end of the sleeve attached to an outer surface of the potted plant.

FIG. 74 is a cross-sectional view of another version of a sleeve constructed in accordance with the present invention wherein a separate skirt portion is connected to an inner surface of the sleeve via a bonding material.

FIG. 75 is a perspective view of the sleeve and connected skirt of FIG. 74.

FIG. 76 is a perspective view of a potted plant disposed upon a sheet of material having a bonding material on a portion of a lower surface of the sheet of material.

FIG. 77 is a perspective view of the sheet of material of FIG. 76 wrapped about the potted plant of FIG. 76 to form a pot cover having bonding material on an outer surface thereof.

FIG. 78 is a perspective view of another sleeve constructed in accordance with the present invention.

FIG. 79 is a perspective view of the potted plant of FIG. 77 disposed within the sleeve of FIG. 78 wherein the sleeve of FIG. 78 is connected to an outer portion of the pot cover of FIG. 77 by the bonding material on the outer surface of the cover.

FIG. 80 is a partial cutaway, perspective view of a sleeve constructed in accordance with the present invention, the sleeve having a bonding material disposed upon portions of an inner surface thereof.

FIG. 81 is a perspective view of a covered pot such as the covered pot of FIG. 77 disposed within the sleeve of FIG. 80 wherein the bonding material on the cover is connected to the bonding material on the sleeve.

FIG. 84 is an elevational view of a sheet of material having a bonding material disposed near three edges of the sheet of material.

FIG. 85 is a perspective view of the sheet of material of FIG. 84 wrapped about a covered potted plant to form a sleeve with an upper end of the sleeve partially sealed.

FIG. 86 is a perspective view of the sleeve formed from the sheet of material of FIG. 84 having the upper end thereof completely sealed.

DESCRIPTION OF THE PREFERRED EMBODIMENTS

Figure 14:
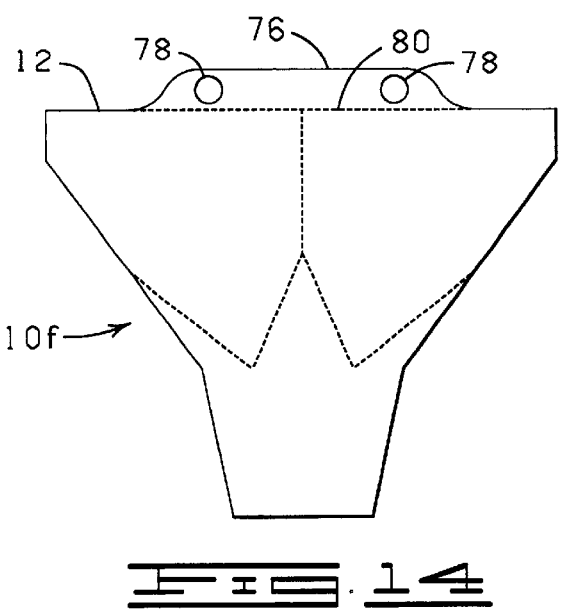
FIG. 14 is an elevational view of another version of the sleeve of FIG. 1 having an extended portion serving as a support extension.
Figure 15:
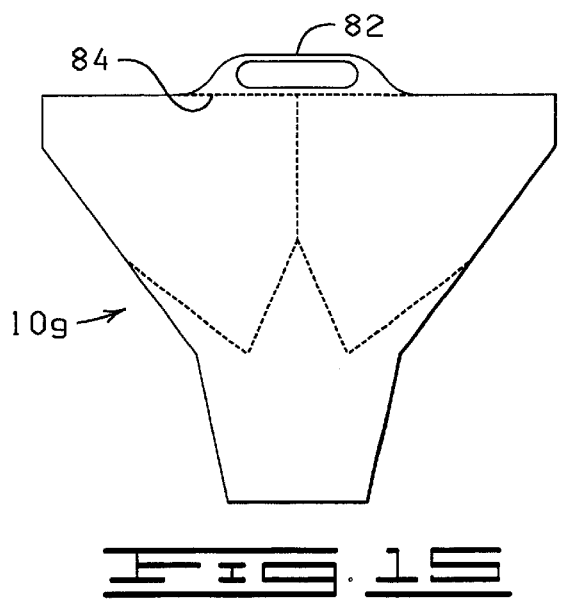
FIG. 15 is an elevational view of another version of the sleeve of FIG. 1 having an extended portion serving as a handle.
Figure 16:
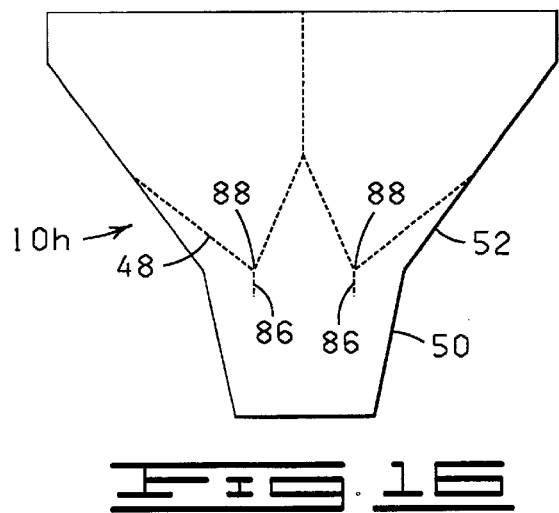
FIG. 16 is an elevational view of another version of the sleeve of FIG. 1 having an additional detaching element for enhancing the extension of a skirt portion of the sleeve after detachment of an upper portion of the sleeve.

The present invention contemplates a plant packaging system comprising a combination of a protective sleeve portion and a decorative cover portion having a base and skirt for packaging a potted plant. The protective sleeve portion can be detached from the decorative cover portion of the package system once the protective function of the sleeve portion has been completed, thereby exposing the decorative cover portion and allowing the skirt to extend angularly from the base. The protective sleeve portion and decorative cover portion may be of unitary construction or may be separate components which are attached together by various bonding materials.

More specifically, the present invention contemplates a plant cover for covering a pot having an outer peripheral surface. The plant cover comprises (1) a base portion having a lower end, an upper end, an outer peripheral surface, and an area of excess material for allowing extension of a portion of the base portion and having an opening extending from the upper end to the lower end, and (2) an upper portion extending from the upper end of the base portion and detachable therefrom, and wherein when the upper portion is detached from the upper end of the base portion, the area of excess material expands causing portions of the base portion to extend angularly from the base. In general, the base portion is sized to substantially cover the outer peripheral surface of the pot. The upper portion may be detachable via a detaching element such as perforations, tear strips and zippers. The plant cover may have an extended portion extending from the upper portion for serving as a handle or support device.

More particularly, the present invention may be a plant cover comprising (1) a base portion having a lower end, an upper end, and an outer peripheral surface and having an opening extending from the upper end to the lower end, (2) an upper portion extending from the upper end of the base portion and detachable therefrom, (3) and an expansion element integral to the base portion and optionally integral to the upper portion, for allowing expansion of a portion of the base portion into a skirt portion extending angularly from the base portion when the upper portion is detached from the upper end of the base portion. The expansion element may be a plurality of vertical pleats, a plurality of vertical folds each having a Z-shaped cross section, a plurality of vertical accordion-type folds, or other similar types of expandable forms.

More particularly, the plant cover may comprise (1) a base portion having a lower end, an upper end, an outer peripheral surface, and having an opening extending from the upper end to the lower end, (2) a skirt portion attached to the base portion and having an upper end and extending a distance beyond the upper end of the base portion, (3) an expansion element integral to at least one of the skirt portion and the base portion for enabling at least a portion of the skirt portion to be extended angularly from the base portion, and (4) an upper portion attached to the upper end of the skirt portion and detachable therefrom, and wherein when the upper portion is detached from the upper end of the skirt portion, the expansion element enables the skirt portion to be extended angularly from the base portion.

The present invention further contemplates a tubular sleeve for containing a pot assembly, and having a lower end, an upper end, an outer peripheral surface, and an inner peripheral surface surrounding an inner retaining space. The tubular sleeve may comprise (1) a base portion having a lower end and an upper end and a retaining space for enclosing the pot assembly, and sized to substantially cover the pot assembly, (2) a skirt portion extending beyond the upper end of the base portion and continuous therewith and having an upper peripheral edge, and (3) an upper portion having an upper peripheral edge and a lower peripheral edge, the lower peripheral edge connected to the upper peripheral edge of the skirt portion and detachable therefrom and extending a distance therefrom, and sized to substantially surround and encompass a floral grouping, and wherein when the upper portion is detached from the upper peripheral edge of the skirt portion, the skirt portion extends angularly from the base portion.

The tubular sleeve may further comprise an expansion element integral to at least one of the skirt portion and the base portion for enhancing the angular extension of at least a portion of the skirt portion away from the base portion. The base portion and the skirt portion may be constructed from a first material and the upper portion may be constructed from a second material different from the first material.

The tubular sleeve may form part of a plant package when used in conjunction with a pot assembly disposed within the retaining space of the base portion of the tubular sleeve, the pot assembly having a floral grouping disposed therein, and wherein the pot assembly is substantially surrounded and encompassed by the base portion and the floral grouping is substantially surrounded and encompassed by the upper portion.

The present invention further contemplates a plant cover comprising, (1) a base portion having a lower end, an upper end, an outer peripheral surface, and having an opening extending from the upper end to the lower end, (2) a skirt portion attached to the base portion and extending a distance beyond the upper end of the base portion, and (3) an upper portion connected to the outer peripheral surface of the base portion and extending from the upper end of the base portion and detachable therefrom and substantially surrounding the skirt portion, and wherein when the upper portion is detached from the upper end of the base portion, the skirt portion is exposed allowing the skirt portion to extend angularly from the base portion. Further, the base portion may comprise a bonding material for bondingly connecting to the upper portion. Also, the base portion may comprise a bonding material for bondingly connecting to a pot disposed therein. Further, the upper portion may comprise a bonding material for bondingly connecting to the base portion. The plant cover may further comprise part of a plant package which includes a pot disposed within the inner retaining space of the base portion, the pot having a floral grouping disposed therein, and wherein the pot is substantially surrounded and encompassed by the base portion and the floral grouping is substantially surrounded and encompassed by the upper portion.

The present invention further contemplates a plant cover comprising (1) a tubular sleeve having a lower end, an upper end, an outer peripheral surface, and an inner peripheral surface surrounding an inner retaining space, and further comprising (a) a base portion for enclosing a pot, the base portion having an upper end and a lower end and sized to substantially cover the outer peripheral surface of the pot, and (b) an upper portion having an upper end and a lower end, the lower end detachably connected to the upper end of the base portion and extending a distance therefrom, and wherein the upper portion is sized to substantially surround and encompass a floral grouping disposed within the pot, and (2) a skirt portion positioned within the tubular sleeve and having an upper end and a lower end, the lower end attached to the inner peripheral surface of the base portion, the upper end of the skirt portion freely extending a distance beyond the upper end of the base portion and substantially surrounded and encompassed by the upper portion and wherein when the upper portion is detached from the upper end of the base portion, the skirt portion is exposed allowing the skirt portion to be extended angularly from the upper end of the base portion.

The base portion and the skirt portion of the tubular sleeve may be constructed from a first material and the upper portion constructed from a second material different from the first material. The base portion and the upper portion of the tubular sleeve may be constructed from a first material and the skirt portion constructed from a second material different from the first material. The plant cover may comprise a portion of a plant package which additionally comprises a pot disposed within the tubular sleeve, the pot having a floral grouping disposed therein, and wherein the pot is substantially surrounded and encompassed by the base portion and the floral grouping is substantially surrounded and encompassed by the upper portion.

These embodiments and others of the present invention are now described in more detail below.

The Embodiments and Methods of Use of FIGS. 1–20

Shown in FIG. 1 and designated therein by the general reference numeral 10 is a flexible bag or sleeve of unitary construction. The sleeve 10 initially comprises a flexible flat collapsed piece of material which is openable in the form of a tube or sleeve. The sleeve 10 may be tapered outwardly from the lower end toward a larger diameter at its upper end. In its flattened state the sleeve 10 has an overall trapezoidal or modified trapezoidal shape, and when opened is substantially frusto-conical to coniform. It will be appreciated, however, that the sleeve 10 may comprise variations on the aforementioned shapes or may comprise significantly altered shapes such as square or rectangular, wherein the sleeve 10 when opened has a cylindrical form, as long as the sleeve 10 functions in accordance with the present invention in the manner described herein.

The sleeve 10 has an upper end 12, a lower end 14, an outer peripheral surface 16 and in its flattened state has a first side 18 and a second side 20. The sleeve 10 has an opening 21 (FIG. 2) at the upper end 12 and may be open at the lower end 14, or provided with excess material at least sufficient to form a closed bottom of the sleeve 10 at the lower end 14. The sleeve 10 also has an inner peripheral surface 22 which, when the sleeve 10 is opened, defines and encompasses an inner retaining space 24 as shown in FIG. 2. When the lower end 14 of the sleeve 10 has a closed bottom, a portion of the lower end 14 may be inwardly folded to form one or more gussets for permitting a circular bottom of an object such as a potted plant 30 (FIGS. 2 and 4) to be disposed into the inner retaining space 24 of the lower end 14 of the sleeve 10.

The sleeve 10 is generally frusto-conically shaped, but the sleeve 10 may be, by way of example but not by way of limitation, cylindrical, frusto-conical, a combination of both frusto-conical and cylindrical, or any other shape, as long as the sleeve 10 functions as described herein as noted above. Further, the sleeve 10 may comprise any shape, whether geometric, non-geometric, asymmetrical and/or fanciful as long as it functions in accordance with the present invention. The sleeve 10 may also be equipped with drains or ventilation holes (not shown), or can be made from permeable or impermeable materials.

The material from which the sleeve 10 is constructed has a thickness in a range from about 0.1 mil to about 30 mils. Often, the thickness of the sleeve 10 is in a range from about 0.5 mil to about 10 mils. Preferably, the sleeve 10 has a thickness in a range from about 1.0 mil to about 5 mils. More preferably, the sleeve 10 is constructed from a material which is flexible, semi-rigid, rigid, or any combination thereof. The sleeve 10 may be constructed of a single layer of material or a plurality of layers of the same or different types of materials. Any thickness of the material may be utilized as long as the material functions in accordance with the present invention as described herein. The layers of material comprising the sleeve 10 may be connected together or laminated or may be separate layers. Such materials used to construct the sleeve 10 are described in U.S. Pat. No. 5,111,637 entitled "Method For Wrapping A Floral Grouping" issued to Weder et al., on May 12, 1992, which is hereby expressly incorporated herein by reference. Any thickness of material may be utilized in accordance with the present invention as long as the sleeve 10 may be formed as described herein, and as long as the formed sleeve 10 may contain at least a portion of a pot 32 or the potted plant 30 or a floral grouping, as described herein. Additionally, an insulating material such as bubble film, preferable as one of two or more layers, can be utilized in order to provide additional protection for the item, such as the floral grouping , contained therein.

In one embodiment, the sleeve 10 may be constructed from two polypropylene films. The material comprising the sleeve 10 may be connected together or laminated or may be separate layers. In an alternative embodiment, the sleeve 10 may be constructed from only one of the polypropylene films.

The sleeve 10 may also be constructed, in whole or in part, from a cling material. "Cling Wrap or Material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of the pot 32. This connecting engagement is preferably temporary in that the material may be easily removed, i.e., the cling material "clings" to the pot 32.

The cling material is constructed and treated if necessary, from polyethylene such as Cling Wrap made by Glad®, First Brands Corporation, Danbury, Conn. The thickness of the cling material will, in part, depend upon the size of sleeve 10 and the size of the pot 32 in the sleeve 10, i.e., generally, a larger pot 32 may require a thicker and therefore stronger cling material. The cling material will range in thickness from less than about 0.1 mil to about 10 mils, and preferably less than about 0.5 mil to about 2.5 mils and most preferably from less than about 0.6 mil to about 2 mils. However, any thickness of cling material may be utilized in accordance with the present invention which permits the cling material to function as described herein.

The sleeve 10 is constructed from any suitable material that is capable of being formed into a sleeve and wrapped about the potted plant 30 or the pot 32. Preferably, the material comprises paper (untreated or treated in any manner), metal foil, polymeric film, non-polymeric film, fabric (woven or nonwoven or synthetic or natural), cardboard, fiber, cloth, burlap, or laminations or combinations thereof.

The term "polymeric film" means a material made of a synthetic polymer such as a polypropylene or a naturally occurring polymer such as cellophane. A polymeric film is relatively strong and not as subject to tearing (substantially non-tearable), as might be the case with paper or foil.

The material employed in the construction of the sleeve 10 may vary in color and may consist of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil And/Or Synthetic Organic Polymer" issued to Kingman on Sep. 15, 1992 and which is hereby expressly incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent, neon, or the like, qualities. Each of the above-named characteristics may occur alone or in combination and may be applied to the upper and/or lower surface of the material comprising the sleeve 10. Moreover, portions of the material used in constructing the sleeve 10 may vary in the combination of such characteristics. The material utilized for the sleeve 10 itself may be opaque, translucent, transparent, or partially clear or tinted transparent.

It will generally be desired to use the sleeve 10 as a covering for the potted plant 30 (FIG. 2). As shown in FIG. 3, the potted plant 30 comprises the pot 32 having an upper rim 34, a lower end 36, an outer peripheral surface 38, and an inner peripheral surface which encompasses an inner retaining space 40 for retaining a floral grouping or plant 42. The lower end 36 of the pot 32 is closed but may have holes for permitting water drainage. The term "pot" as used herein refers to any type of container used for holding the floral grouping or plant 42. Examples of pots, used in accordance with the present invention include, but not by way of limitation, clay pots, wooden pots, plastic pots, pots made from natural and/or synthetic fibers, or any combination thereof. The pot 32 is adapted to receive the floral grouping 42 in the inner retaining space 40. The floral grouping 42 may be disposed within the pot 32 along with a suitable growing medium described in further detail below, or other retaining medium, such as a floral foam. It will also be understood that the floral grouping 42, and any appropriate growing medium or other retaining medium, may be disposed in the sleeve 10 without the pot 32.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping 42 comprises a bloom or foliage portion and a stem portion. Further, the floral grouping 42 may comprise a growing potted plant having a root portion (not shown) as well. However, it will be appreciated that the floral grouping may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

In accordance with the present invention, a bonding material may be disposed on a portion of the sleeve 10 to assist in holding the sleeve 10 to the pot 32 having the floral grouping 42 therein when such a pot 32 is disposed within the sleeve 10 or to assist in closing the upper end 12 of the sleeve 10 or adhering the sleeve 10 to the pot 32 after the pot 32 has been disposed therein, as will be discussed in further detail below.

It will be understood that the bonding material may be disposed as a strip or block on a surface of the sleeve 10. The bonding material may also be disposed upon either the outer peripheral surface 16 or the inner peripheral surface 22 of the sleeve 10, as well as upon the pot 32. Further, the bonding material may be disposed as spots of bonding material, or in any other geometric, non-geometric, asymmetric, or fanciful form, and in any pattern including covering either the entire inner peripheral surface and/or outer peripheral surface of the sleeve 10 and/or the pot or pot cover. The bonding material may be covered by a cover or release strip which can be removed prior to the use of the sleeve, pot or pot cover. The bonding material can be applied by means known to those of ordinary skill in their art. One method for disposing a bonding material, in this case an adhesive, is described in U.S. Pat. No. 5,111,637 entitled "Method For Wrapping A Floral Grouping" issued to Weder et al., on May 12, 1992, which has been incorporated by reference above.

The term "bonding material" when used herein means an adhesive, frequently a pressure sensitive adhesive, or a cohesive. When the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer or hot melt material which may be applied to the material and, in this instance, heat, sound waves, or vibrations, also must be applied to effect the sealing.

The term "bonding material" when used herein also means any type of material or thing which can be used to effect the bonding or connecting of the two adjacent portions of the material or sheet of material to effect the connection or bonding described herein. The term "bonding material" may also include ties, labels, bands, ribbons, strings, tapes (including single or double-sided adhesive tapes), staples or combinations thereof. Some of the bonding materials would secure the ends of the material while other bonding material may bind the circumference of a wrapper, or a sleeve, or, alternatively and/or in addition, the bonding materials would secure overlapping folds in the material and/or sleeve. Another way to secure the wrapping and/or sleeve is to heat seal the ends of the material to another portion of the material. One way to do this is to contact the ends with an iron of sufficient heat to heat seal the material.

Alternatively, a cold seal adhesive may be utilized as the bonding material. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

The term "bonding material" when used herein also means any heat or chemically shrinkable material, and static electrical or other electrical materials, chemical welding materials, magnetic materials, mechanical or barb-type fastening materials or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the pot, or to both the material itself and the pot.

Certain versions of the sleeve 10 described herein may be used in conjunction with a preformed plant cover as explained in greater detail below.

As shown in FIG. 1, the sleeve 10 is demarcated into an upper portion 44 having an outer surface area 45 and a lower portion 46 having an outer surface area 47. The lower portion 46 of the sleeve 10 is generally sized to contain and tapered to fit the potted plant 30 or pot 32. The upper portion 44 of the sleeve 10 is sized to substantially surround and encompass the floral grouping 42 of the potted plant 30 disposed within the lower portion 46 of the sleeve 10. The sleeve 10 is demarcated into the upper portion 44 and the lower portion 46 by a detaching element 48 for enabling the detachment of the upper portion 44 of the sleeve 10 from the lower portion 46 of the sleeve 10. In the present version, the detaching element 48 is a plurality of generally laterally-oriented or alternatingly diagonally-oriented perforations which extend circumferentially across the outer peripheral surface 16 of the sleeve 10 from the first side 18 to the second side 20. The term "detaching element," as used generally herein, means any element, or combination of elements, or features, such as, but not by way of limitation, perforations, tear strips, zippers, and any other devices or elements of this nature known in the art, or any combination thereof, which enable the tearing away or detachment of one object from another. Therefore, while perforations are shown and described in detail herein, it will be understood that tear strips, zippers, or any other "detaching elements" known in the art, or any combination thereof, could be substituted therefore and/or used therewith.

In a preferred embodiment, as shown in FIGS. 1, 2 and 4, the lower portion 46 of the sleeve 10 further comprises a base portion 50, and a skirt portion 52. The base portion 50 comprises that part of the lower portion 46 which, when the pot 32 is placed into the lower portion 46, has an inner peripheral surface which is substantially adjacent to and surrounds the outer peripheral surface 38 of the pot 32. The skirt portion 52 comprises that part of the lower portion 46 which comprises a plurality of portions 53 which extend beyond the upper rim 34 of the pot 32 and adjacent at least a portion of the floral grouping 42 contained within the pot 32 and which is left to freely extend at an angle, inwardly or outwardly, from the base portion 50 when the upper portion 44 of the sleeve 10 is detached from the lower portion 46 of the sleeve 10 by actuation of the detaching element 48. In the intact sleeve 10, the skirt portion 52 comprises an upper peripheral edge congruent with the detaching element 48 which is connected to a lower peripheral edge, also congruent with the detaching element 48, of the upper portion 44 of the sleeve 10. In FIGS. 1 and 2, the upper peripheral edge of the skirt portion 52 is congruent with a series of alternatingly diagonally-oriented lines of perforations which together form a zig-zag and comprise the detaching element 48.

The upper portion 44 of the sleeve 10 may also have an additional detaching element 54 indicated as a plurality of vertical perforations for facilitating removal of the upper portion 44 and which are disposed more or less vertically therein extending between the detaching element 48 and the upper end 12 of the sleeve 10. The upper portion 44 of the sleeve 10 is separable from the lower portion 46 of the sleeve 10 by tearing the upper portion 44 along both the detaching element 54 and the detaching element 48, thereby separating the upper portion 44 from the lower portion 46 of the sleeve 10. The lower portion 46 of the sleeve 10 remains disposed as the base portion 50 about the pot 32 and as the skirt portion 52 about the floral grouping 42 forming a decorative cover 56 as shown in FIG. 4 which substantially surrounds and encompasses the flower pot 32.

It will be understood that equipment and devices for forming floral sleeves are commercially available, and are well known to a person of ordinary skill in the art.

As noted above, the sleeve 10 may have an open or closed lower end 14. When the lower end 14 is closed the lower end 14 may have one or more gussets 60 formed therein such as that seen in sleeve 10a in FIG. 5 for allowing expansion of the lower end 14 when an object with a broad lower end such as the pot 32 is disposed therein. In another version of the present invention, as shown in sleeve 10b in FIG. 6, a strip of bonding material 62 may be disposed on the inner peripheral surface 22 of the upper portion 44 of the sleeve 10b generally in the vicinity of the upper end 12 of the sleeve 10b for allowing the upper end 12 to be sealed for enclosing the upper portion 44 of the sleeve 10b about a floral grouping disposed therein. In another version of the present invention shown in FIG. 7, a sleeve 10c comprises a flap 64 positioned at the upper end 12 which can be folded over and sealed with a flap bonding strip 66 to an adjacent portion of the outer peripheral surface 16 of the sleeve 10c near the upper end 12 thereof. Other versions of the sleeve (not shown) may comprise ventilation holes or drainage for allowing movement of gases or moisture to and away from the inner space of the sleeve.

In another version of the present invention, shown in FIG. 8, a sleeve 10d is exactly like the sleeve 10 but further comprises an inner strip of bonding material 68 disposed upon a portion of the inner peripheral surface 22 of the base portion 50 of the sleeve 10d. The strip of bonding material 68 functions to enable the inner peripheral surface 22, or a portion thereof, to be bondingly connected to the outer peripheral surface 38 of the pot 32 disposed therein causing the sleeve 10d to be bondingly connected to the pot 32.

In yet another version of the present invention, shown in FIGS. 9–13, a bonding material 70 is disposed on a portion of the outer peripheral surface 16 of the base portion 50 of a sleeve 10e. After the pot 32 is disposed in the inner retaining space 24 of the base portion 50, the sleeve 10e is manually or automatically crimped about the outer peripheral surface 38 of the pot 32 in the vicinity of the bonding material 70 thereby forming overlapping folds 72 in the base portion 50 which are bondingly connected together by the bonding material 70 to add structural integrity to the base portion 50 and to cooperate to hold the base portion 50 in the shape of a pot cover or for causing the base portion 50 of the sleeve 10e to engage the outer peripheral surface 38 of the pot 32 and be held firmly thereabout. The bonding material 70 may be disposed on the sleeve 10e at a position below the upper rim 34 of the pot 32 (FIGS. 9–11) or may be disposed at a position on the base portion 50 of the sleeve 10e above the upper rim 34 of the pot 32 (such as shown in FIGS. 12–13) such that the overlapping folds 72 crimpingly formed are located in a position generally above the upper rim 34 of the pot 32.

In another embodiment, shown in FIG. 14, the sleeve designated as 10f, may further comprise an extended portion comprising a support extension 76 which extends away from a portion of the upper end 12 of the sleeve 10f. The support extension 76 has one or more apertures 78 disposed therein thereby adapting the sleeve 10f to be supported on a support assembly (not shown) commercially available and known by one of ordinary skill in the art such as a pair of wickets for shipment, storage, assembly of the sleeve 10f, placement of the pot 32 within the sleeve 10f, or other functions known in the art. The support extension 76 may have a plurality of perforations 80 or other detaching elements for allowing the support extension 76 to be removed from the upper end 12 of the sleeve 10f after the sleeve 10f has been provided for use as described elsewhere herein. In another version of the invention, shown in FIG. 15, a sleeve 10g has an extended portion comprising a handle 82 for carrying the potted plant package inside the sleeve 10g. The sleeve 10g may further comprise a detaching element 84 comprising perforations for removing the handle 82 at a later time.

Figure 17:
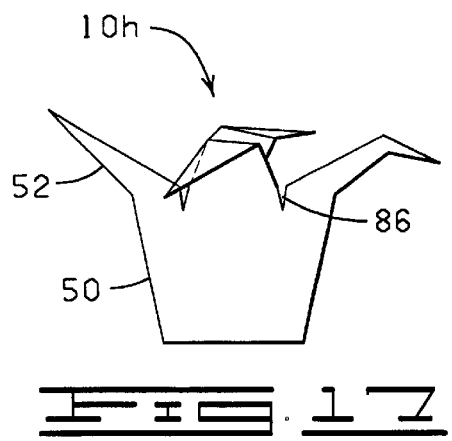
FIG. 17 is a perspective view of the sleeve of FIG. 16 after the upper portion has been removed.

Other versions of the present invention shown in FIGS. 16–19, may comprise additional perforated areas for enhancing angularity of the extension of the skirt portion away from the base portion after the upper portion of the sleeve has been detached. For example, sleeve 10h in FIG. 16 comprises perforations 86 which extend vertically downward from the downward-pointing apexes 88 in the detaching element 48, comprising lateral perforations, which demarcates the upper peripheral edge of the skirt portion 52 of the sleeve 10h. After the upper portion 44 of the sleeve 10h is detached, the perforations 86 are open, allowing adjacent portions of the skirt portion 52 to be deflected at an increased angle to the base portion 50 as shown in FIG. 17.

Similarly, sleeve 10i in FIG. 18 comprises notch perforations 90 which allow the removal of a notch of material 92 in the vicinity of the downward-pointing apexes 88 in the detaching element 48, comprising lateral perforations, which demarcates the upper peripheral edge of the skirt portion 52 of the sleeve 10i. After the upper portion 44 of the sleeve 10i is detached, the notches 92 are removed, allowing the adjacent portions of the skirt portion 52 to be deflected at an increased angle to the base portion 50 as shown in FIG. 19.

Sleeve 10j, shown in FIG. 20, is an example of a sleeve constructed generally in accordance with the invention as described herein except the sleeve 10j has an upper portion 94 which is constructed of a material different from a lower portion 95. The upper portion 94 and lower portion 95 are shown as bondingly connected along a sealed area 96. The upper portion 94, along with a portion of the lower portion 95 may be disconnected from each other via a detaching element such as perforations 97 and 98, as described earlier.

Embodiments and Methods of Use of FIGS. 21–34

Attention is now drawn to the sleeve shown in FIG. 21 which is designated by the general reference numeral 100. The sleeve 100 comprises a unitary construction and has a base portion 102 having a sidewall 103, skirt portion 104, a sleeve portion 106 and at least one expansion element 108 and further has an outer peripheral surface 110, an open upper end 112 and a lower end 114 which may or may not be open or closed. The sleeve 100 has an inner retaining space 116 which extends from the open upper end 112 to the lower end 114 and which is encompassed by an inner peripheral surface 118 of the sleeve 100. The base portion 102 is sized to substantially cover the outer peripheral surface 38 of the pot 32 and the sleeve portion 106 is sized to substantially surround the floral grouping 42 within the pot 32 which is disposed within the inner retaining space 116 of the sleeve 100.

The sleeve portion 106 extends from and is attached to the upper end 120 of the skirt portion 104 and is detachable therefrom via a detaching element 122 such as one described in detail above. The expansion element 108 is integral to at least one of the base portion 102 and the skirt portion 104 and may extend into the sleeve portion 106 as shown in FIG. 21. The expansion element 108 functions to allow expansion of a portion of the skirt portion 104 of the sleeve 100 into a skirt 124, such as the skirt 124 of a decorative cover 126 formed therefrom and shown in FIG. 22 which extends angularly from the base portion 102 when the sleeve portion 106 is detached from the upper end 120 of the skirt portion 104.

As shown in FIG. 21, each expansion element 108 of the sleeve 100 comprises one or more areas of excess material shaped in the form of a pleat which extends from the base portion 102 to the upper end 112 of the sleeve 100. As used herein, the term "excess material" means an amount of material which has a greater surface area than would actually be necessary to form that portion of the plant covering were that portion of the plant covering actually flattened. The expansion element 108 can expand causing portions of the skirt portion 104 to extend angularly from the base portion 102 forming the skirt 124 and the decorative cover 126 about a portion of the floral grouping 42 of the potted plant 30 as shown in FIG. 22. It should be noted that although the illustrated floral grouping 42 of FIGS. 2 and others are different from the floral group illustrated in, for example, FIG. 22, no practical difference is intended. The expansion element 108 may further comprise a plurality of detachable notches such as shown in FIGS. 18 and 19 and as explained above.

Shown in FIG. 23 is a sleeve designated by the reference numeral 100a which is exactly the same as sleeve 100 except that sleeve 100a has a plurality of expansion elements 108a which do not extend from the base portion 102a all the way to the upper end 112a of the sleeve portion 106a of the sleeve 100a but only to a position below the upper end 112a of the sleeve 100a. Shown in FIG. 24 is a cross-section through the sleeve 100a which reveals the pleated nature of the expansion elements 108a therein. When the sleeve portion 106a is removed, the expansion elements 108a can expand as for sleeve 100 as described above causing portions of the skirt portion 104a to extend angularly from the base portion 102a forming a skirt (not shown—a skirt exactly the same as the skirt 124 of the decorative cover 126 shown in FIG. 22).

Attention is now drawn to FIG. 25 and to the sleeve shown therein which is designated by the general reference numeral 100b. Sleeve 100b is exactly the same as sleeve 100 except that the sleeve 100b has a plurality of Z-shaped expansion elements 108b. As for expansion element 108 of sleeve 100, the expansion elements 108b of sleeve 100b can expand causing portions of a skirt portion 104b to extend angularly from a base portion 102b forming a skirt 124b in a decorative cover 126b about a portion of the floral grouping 42 of the potted plant 30 as shown in FIG. 26.

Similarly, shown in FIG. 27 is a sleeve designated by the reference numeral 100c and which is exactly the same as sleeve 100b except that sleeve 100c has a plurality of expansion elements 108c which do not extend from the base portion 102c all the way to an upper end 112c of an upper portion 106c of the sleeve 100c but only to a position below the upper end 112c of the sleeve 100c. Shown in FIG. 28 is a cross-section through the sleeve 100c of FIG. 27 which reveals the Z-shaped nature of the expansion elements 108c therein. When the upper portion 106c is removed, the expansion elements 108c can expand as for sleeve 100b causing portions of a skirt portion 104c to extend angularly from the base portion 102c forming a skirt exactly the same as the skirt 124b of the decorative cover 126b shown in FIG. 26.

Attention is now drawn to FIG. 29 and to the sleeve shown therein which is designated by the general reference numeral 100d. Sleeve 100d is exactly the same as sleeve 100 except that the sleeve 100d has a plurality of fluted or groove-shaped expansion elements 108d. As for expansion element 108 of sleeve 100, the expansion elements 108d of sleeve 100d can expand causing portions of a skirt portion 104d to extend angularly from a base portion 102d forming a skirt 124d of a decorative cover 126d about a portion of the floral grouping 42 of the potted plant 30 as shown in FIG. 30.

Similarly, shown in FIG. 31, is a sleeve designated by the reference numeral 100e and which is exactly the same as sleeve 100d except that sleeve 100e has a plurality of expansion elements 108e which do not extend from a base portion 102e all the way to an upper end 112e of an upper sleeve portion 106e of the sleeve 100e but only to a position below the upper end 112e of the sleeve 100e. Shown in FIG. 32 is a cross-section through the sleeve 100e of FIG. 31 which reveals the fluted nature of the expansion elements 108e therein. When the upper portion 106e is removed, the expansion elements 108e can expand as for sleeve 100d causing portions of the skirt portion 104e to extend angularly from the base portion 102e forming a skirt exactly the same as skirt 124d of the decorative cover 126d shown in FIG. 30.

It will be appreciated by one of ordinary skill in the art that the shapes of the expansion elements described above are but several of the shapes which can be contemplated for the present invention. Other shapes which may be contemplated are gussets, fans, and "accordion-folds" to name but a few.

Each of the sleeves 100–100e may further comprise a support extension 130 which extends away from a portion of the upper end of the sleeve such as for the sleeve 100f as shown in FIG. 33. The support extension 130 has one or more apertures 132 disposed therein for allowing the sleeve 100f to be supported on a support assembly 134 which may comprise, for example, a pair of wickets 136 for shipment, storage, assembly of the sleeve 100f, placement of a pot within the sleeve 100f, or other functions known in the art. The support extension 130 may have a plurality of perforations 138 or other detaching elements for allowing the support extension 130 to be removed from the sleeve 100f after the sleeve 100f has been provided for use as described elsewhere herein. In another version of the invention, and applicable to any of the sleeves described above, or elsewhere herein, shown in FIG. 34 is a sleeve 100g which has a handle 140 for carrying the potted plant package by the sleeve 100g. The sleeve 100g further comprises a detaching element 142 comprising perforations for removing a handle 140 at a later time.

As noted above, the protective sleeve and decorative cover components of the present invention may comprise a unitary construction, as described in the versions of the invention exemplified in FIGS. 1–34, or may comprise separately formed components which are attached together by various bonding materials, as described below.

For example, the invention may comprise, in one series of embodiments, a sleeve-cover combination and a method for packaging a pot or potted plant. In the method, a preformed decorative plant cover is provided. The plant cover has a bonding material disposed upon a portion of its inner peripheral surface for bonding the cover to the outer peripheral surface of a pot. In one embodiment, a bonding material is also disposed upon a portion of the outer peripheral surface of the pot. In the case where a decorative cover is provided which does not have a bonding material disposed on the inner peripheral surface thereof, a pot having a bonding material disposed upon a portion of the outer peripheral surface thereof is provided for bonding to a portion of the inner peripheral surface of the decorative cover. The pot is inserted into the pot retaining space of the preformed pot cover whereby the bonding material engages the inner peripheral surface of the cover and bondingly connects the outer peripheral surface of the pot thereto providing a covered pot.

In the next step of the method, a sleeve portion is provided for applying to the covered pot for providing protection to the plant already, or soon to be, disposed within the retaining space of the pot. The sleeve portion is preferably an open-ended, frusto-conically shaped, or semi frusto-conically shaped, tube similar to sleeves well known to persons of ordinary skill in the art. The sleeve may be free of any bonding material disposed thereon, or a bonding material may be disposed on a portion of the inner peripheral surface of the sleeve, preferably near the lower end of the sleeve. The sleeve is opened and the covered pot, as described, is deposited into the inner retaining space of the sleeve. As noted above, the decorative cover which covers the pot may have a bonding material disposed upon a portion of the outer peripheral surface thereof.

In one version of the method, a covered pot free of any externally-disposed bonding material is deposited into a sleeve having a bonding material disposed on a portion of the inner peripheral surface thereof. As the covered pot is moved downwardly into the sleeve, the bonding material on the inner peripheral surface of the sleeve engages a portion of the outer peripheral surface of the cover causing the sleeve to be bondingly connected to the cover disposed about the covered plant. Preferably, the sleeve bondingly engages a portion of the cover near the upper end of the base portion of the cover yet below the skirt portion of the cover to allow free extension of the skirt portion of the cover.

In an alternative version of the invention, as noted above, the bonding material may be disposed on the outer surface of the cover of the covered pot while the sleeve may be free of a bonding material. In this case, when the covered pot is disposed into the open sleeve, the bonding material on the outer peripheral surface of the cover engages a portion of the inner peripheral surface of the sleeve causing the sleeve to be bondingly connected to the cover of the covered plant. Again, preferably the sleeve bondingly engages a portion of the cover near the upper end of the base portion of the cover yet below the skirt portion of the cover.

In yet another version of the method of the present invention, the bonding material may be disposed on both the outer surface of the covered pot and the inner peripheral surface of the sleeve. In such a case, preferably the bonding material both of the cover and the sleeve is a cohesive which allows bonding to itself but not to dissimilar surfaces. The embodiments of the sleeve/cover combination or package briefly described above are described in more detail below in relation to FIGS. 35–57.

Embodiments of FIGS. 35–44

Attention is now drawn to the embodiments of the present invention as shown in FIGS. 35–39. Represented by the general reference numeral 150 in FIG. 35 is a pot. The pot 150 has an upper end 152, a lower end 154, an outer peripheral surface 156, an upper opening 158, and an inner retaining space 160. Shown in FIGS. 36 and 37 is a plant cover referred to by the general reference numeral 162. The plant cover 162 has an outer peripheral surface 164, an upper end 166, a lower end 168, a base portion 170 sized generally to accommodate pot 150, a skirt portion 172 which extends from the base portion 170, an upper opening 174, an inner or pot retaining space 176, an inner peripheral surface 178, and a bonding material 180 which is disposed upon at least a portion of the inner peripheral surface 178. Shown in FIG. 37 is the pot 150 which has been inserted into the pot retaining space 176 of the plant cover 162.

As indicated in FIG. 37 the bonding material 180 on the inner peripheral surface 178 of the plant cover 162 is bondingly connected to the outer peripheral surface 156 of the pot 150. The bonding material 180 is shown in the Figures as being preferably disposed near an upper end of the base portion 170 of the plant cover 162 wherein the bonding material 180 bonds at a position near the upper end 152 of the pot 150. However, the bonding material 180 may be disposed at other locations on the inner peripheral surface 178 of the plant cover 162 for bonding to other positions or points of the outer peripheral surface 156 of the pot 150.

Shown in FIG. 38 is a sleeve designated by the reference numeral 182. The sleeve 182 has an upper end 184, an upper opening 186, a lower end 188, a lower opening 190, an outer peripheral surface 192, an inner peripheral surface 194, and an inner retaining space 196 which is encompassed generally by the inner peripheral surface 194. A bonding material 198 is disposed upon a portion of the inner peripheral surface 194. In FIG. 38 the bonding material 198 is shown disposed on the inner peripheral surface 194 near the lower end 188 of the sleeve 182, but it will be understood by a person of ordinary skill in the art that the bonding material 198 may be disposed elsewhere on the inner peripheral surface 194 of the sleeve 182.

Sleeve 182 further comprises lateral perforations 200 and vertical perforations 202 for allowing detachment of an upper portion of the sleeve 182. Perforations 202 may also represent other forms of detaching elements for detaching the upper portion of the sleeve 182. FIG. 39 shows a sleeve/cover package 204 comprising the plant cover 162 and pot 150 as shown in FIG. 37 and the sleeve 182 as shown in FIG. 38 after the pot 150 and plant cover 162 have been inserted into the inner retaining space 196 of the sleeve 182. As shown in FIG. 39, the bonding material 198 bondingly connects a portion of the outer peripheral surface 164 of the plant cover 162 to the inner peripheral surface 194 of the sleeve 182 at a position generally near an upper end of the base portion 170 of the plant cover 162. Once the plant cover 162 with the pot 150 therein has been disposed into the inner retaining space 196 of the sleeve 182, the skirt portion 172 of the plant cover 162 is substantially surrounded and encompassed by the sleeve 182. As will be understood by one of ordinary skill in the art, a portion of the sleeve portion 182 can be removed from the sleeve/cover package 204 when it is desired to decoratively display a plant contained within the pot 150.

Shown in FIG. 40 is a preformed plant cover represented by the general reference numeral 162a. The plant cover 162a is exactly the same as the plant cover 162 shown in FIG. 36 except that the plant cover 162a has an outer bonding material 181a disposed on an outer peripheral surface 164a in addition to a bonding material 180a which is disposed upon an inner peripheral surface 178a of the plant cover 162a. Shown in FIG. 41 is a pot 150 which has been disposed within a pot retaining space 176a of the plant cover 162a wherein the bonding material 180a of the plant cover 162a has bondingly connected to a portion of the outer peripheral surface 156 of the pot 150. The bonding material 181a is shown on the outer peripheral surface 164a of the plant cover 162a.

Shown in FIG. 42 is a sleeve 182a having an outer peripheral surface 192a, a lower end 188a, and an inner peripheral surface 194a. The sleeve 182a is exactly the same as the sleeve 182 shown in FIG. 38 except that sleeve 182a does not have a bonding material disposed on the inner peripheral surface 194a near the lower end 188a of the sleeve 182a. FIG. 43 shows a sleeve/cover package 204a combination exactly as shown in FIG. 41 which has been disposed into an inner retaining space 196a of the sleeve 182a wherein the bonding material 181a on the outer peripheral surface 164a of the plant cover 162a has bondingly connected to a portion of the inner peripheral surface 194a of the sleeve 182a to form the sleeve/cover package 204a. As before, the skirt portion 172a of the plant cover 162a is substantially surrounded and encompassed by the sleeve 182a.

Shown in FIG. 44 is a sleeve/cover package 204b which is comprised of the pot 150 as described above, a plant cover 162a as described above in FIG. 40 and a sleeve 182 as described above in FIG. 38. Sleeve/cover package 204b thus comprises the plant cover 162a having the bonding material 181a on the outer peripheral surface 164a thereof, which is bondingly connected to the bonding material 198 which is on a portion of the inner peripheral surface 194 of the sleeve 182. In a preferred embodiment, the bonding materials 181a and 198 of sleeve/cover package 204b are cohesive materials but may be any bonding material described previously herein.

Embodiments of FIGS. 45–55

Shown in FIG. 45 is a pot designated by the reference numeral 150a which is exactly the same as pot 150 described previously herein except that the pot 150a, which has an upper end 152a, a lower end 154a, and an outer peripheral surface 156a, also has a bonding material 161a disposed on at least a portion of the outer peripheral surface 156a. Shown in FIG. 46 is a preformed plant cover designated by the general reference numeral 162b which has an outer peripheral surface 164b, a base portion 170b, a skirt portion 172b and an inner peripheral surface 178b. The plant cover 162b is exactly the same as the plant cover 162 except that the plant cover 162b does not have a bonding material such as the bonding material 180 disposed upon a portion of the inner peripheral surface 178b.

Shown in FIG. 47 is the plant cover 162b with the pot 150a disposed therein, wherein the bonding material 161a of the pot 150a is bondingly connected to a portion of the inner peripheral surface 178b of the plant cover 162b. Shown in FIG. 48 is a sleeve/cover package 204c which is comprised of the plant cover 162b having the pot 150a therein as shown in FIG. 47 and the sleeve 182 as shown in FIG. 38 which has the inner peripheral surface 194 and the bonding material 198 disposed upon a portion of the inner peripheral surface 194. The bonding material 198 of the sleeve 182 is bondingly connected to a portion of the outer peripheral surface 164b of the base portion 170b of the plant cover 162b. The skirt portion 172b of the plant cover 162b is thus substantially surrounded and encompassed by the sleeve 182.

Shown in FIGS. 49 and 50 is a plant cover 162c having an outer peripheral surface 164c, a base portion 170c, a skirt portion 172c, and an inner peripheral surface 178c. The plant cover 162c is exactly the same as the plant cover 162b of FIG. 46 except that the plant cover 162c further comprises a bonding material 181c disposed upon the portion of the outer peripheral surface 164c of the cover 162c. Shown in FIG. 50 is the plant cover 162c containing the pot 150a (FIG. 45). The pot 150a is bondingly connected to the inner peripheral surface 178c of the plant cover 162c via the bonding material 161a as described previously. Shown in FIG. 51 is sleeve/cover package 204d. The sleeve/cover package 204d comprises the pot 150a contained within the plant cover 162c as described in FIG. 50 which is disposed in the inner retaining space 196a of sleeve 182a shown in FIG. 42. A portion of the inner peripheral surface 194a of the sleeve 182a is bondingly connected to a portion of the outer peripheral surface 164c of the plant cover 162c via the bonding material 181c. The skirt portion 172c of the plant cover 162c is substantially surrounded and encompassed by the sleeve 182a.

Figure 52:
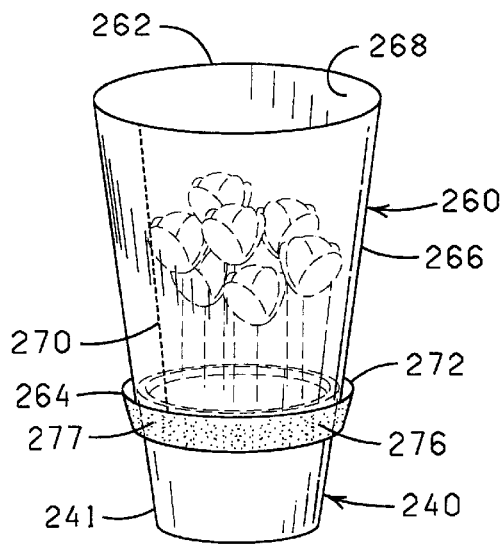
FIG. 52 is a cross-sectional view of the pot of FIG. 45 disposed within the pot cover of FIG. 40 wherein the pot is connected to an inner surface of the pot cover via the bonding material disposed on a portion of the outer surface of the pot.

Shown in FIG. 52 is the pot 150a disposed within the pot retaining space 176a of a plant cover 162a shown in FIG. 40. The plant cover 162a comprises the bonding material 180a disposed on the inner peripheral surface 178a thereof and the bonding material 181a disposed on the outer peripheral surface 164a thereof. The bonding material 161a of the pot 150a is connected to the bonding material 180a of the plant cover 162a. The pot 150a and cover 162a may be disposed within a sleeve such as sleeve 182 or sleeve 182a.

Figure 53:
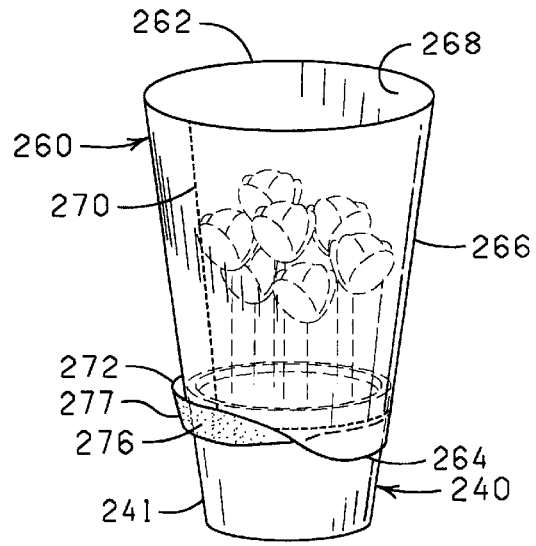
FIG. 53 is a cross-sectional view of the pot cover and pot of FIG. 50 disposed within a sleeve exactly the same as the sleeve shown in FIG. 38 wherein the bonding material on the outer surface of the pot cover connects with the bonding material on the inner surface of the sleeve.

Shown in FIG. 53 is a sleeve/cover package 204e comprising the pot 150a and plant cover 162c disposed within the inner retaining space 196 of the sleeve 182 described in FIG. 38 previously. As indicated in FIG. 53, the bonding material 181c of the plant cover 162c is bondingly connected to the bonding material 198 of the sleeve 182 thereby connecting the outer peripheral surface 164c of the plant cover 162c to a portion of the inner peripheral surface 194 of the sleeve 182. As discussed previously, in the case of using a plant cover having a bonding material on the outer peripheral surface thereof along with a sleeve having a bonding material on the inner peripheral surface thereof, preferably the bonding material is a cohesive. It will be apparent to one of ordinary skill in the art that other combinations of pots, covers and sleeves other than those specifically delineated herein are practicable and are well within the spirit of the embodiments described herein.

Figure 54:
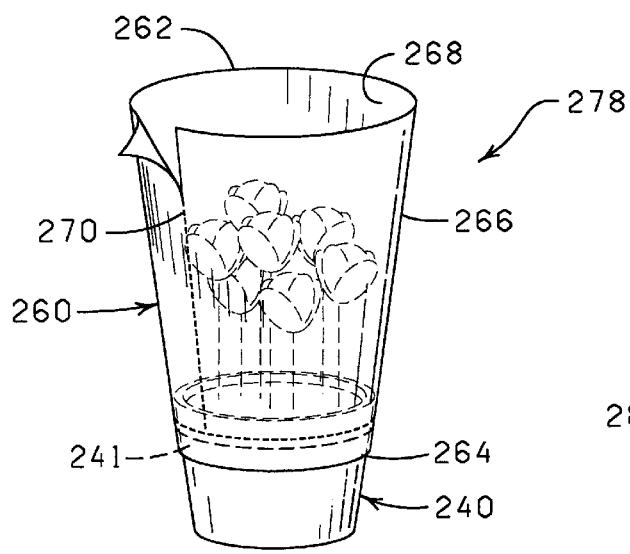
FIG. 54 is a perspective view of an apparatus for pulling a sleeve about a pot cover.
Figure 55:
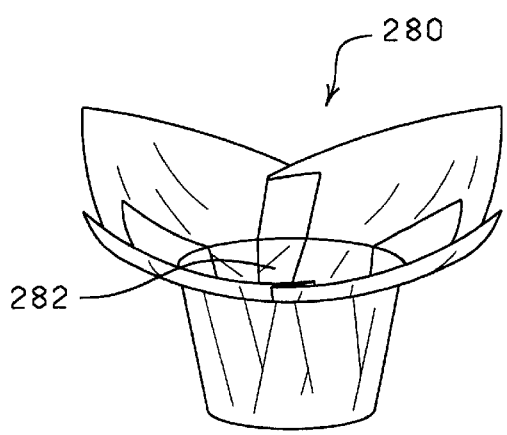
FIG. 55 is a perspective view showing another step in using the apparatus of FIG. 54.

Shown in FIGS. 54 and 55 is one example of a method and apparatus which can be used to cause a sleeve to be attached to the outer peripheral surface of a decorative cover surrounding a potted plant. A pedestal is represented by the reference numeral 210. The pedestal 210 is comprised of a post 212, a base 214 and a pot support surface 216. A potted plant 218 is placed upon the pot support surface 216, the potted plant 218 having a bonding material 220 disposed on the outer peripheral surface of the cover of the potted plant 218. A plurality of sleeves 222 is disposed upon the pedestal 210 near the base 214. A single sleeve 224 is caused to be brought up around the outside of the potted plant 218. The individual sleeve 224 has an inner peripheral surface 226, an upper end 228, and a bonding material 230 disposed upon a portion of the inner peripheral surface 226 preferably near the lower end of the sleeve 224. Shown in FIG. 55 is a sleeve 224 which has been brought up about the exterior of the potted plant 218 wherein the bonding material 230 on the sleeve 224 is caused to be bondingly connected to the bonding material 220 on the exterior surface of the potted plant 218. The sleeve 224 and the potted plant 218 together comprise a sleeve and cover package 232.

Embodiments of FIGS. 56–67

Shown in FIG. 56 and represented by the general reference numeral 238 is a sleeve/plant package comprising a pot 240 and a sleeve 242. The sleeve 242 has an outer peripheral surface 244, an inner peripheral surface 246, a lower end 248, an upper end 250, a plurality of perforations 252 and an inner bonding material 254 disposed on a portion of the inner peripheral surface 246 thereof. The inner bonding material 254 serves to bondingly connect the lower end 248 of the sleeve 242 to a portion of the pot 240, preferably an upper end of the pot 240. It will also be appreciated by one of ordinary skill in the art that the object as represented by the pot 240 could also be a pot covered with a decorative pot cover as described elsewhere herein. In that case the bonding material 254 on the sleeve 242 would bondingly connect the inner peripheral surface 246 of the sleeve 242 to a portion of the outer peripheral surface of the decorative cover surrounding the pot 240.

An alternative embodiment of a sleeve 242a of a sleeve/plant package 238a is shown in FIG. 57. In this embodiment of the sleeve/plant package 238a, the sleeve 242a has no bonding material thereon. Instead, a bonding material 256a is disposed on a portion of an outer peripheral surface 241a of a pot 240a for bondingly connecting the sleeve 242a to the pot 240a. An additional embodiment is represented in FIG. 58 by a sleeve/plant package designated by the reference numeral 238b. The sleeve/plant package 238b comprises a sleeve 242b having a bonding material 254b disposed on a portion of an inner peripheral surface 246b of the sleeve 242b. In addition, the pot 240a has a bonding material 256a disposed on a portion of an outer peripheral surface 241a of the pot 240a. Together the bonding materials 254b and 256a, which preferably are cohesives, cause the sleeve 242b to be bondingly connected to the pot 240a.

Shown in FIG. 59 is yet another version of the present invention comprising a sleeve/plant package designated by the reference numeral 238c. The sleeve/plant package 238c comprises a sleeve 242c and a pot 240. The sleeve 242c has both an inner bonding material 254c which is disposed upon a portion of an inner peripheral surface 246c of the sleeve 242c and an outer bonding material 258c which is disposed upon a portion of an outer peripheral surface 244c of the sleeve 242c. As noted above, any of the sleeve/plant packages 238, 238a, 238b, and 238c may comprise a potted plant having a decorative pot cover in lieu of the pot 240 or 240a to which the aforementioned sleeves are attached.

An alternate version of a sleeve as used in the present invention is shown in FIGS. 60, 61, 62, 63 and 64, and is designated by the general reference numeral 260. The sleeve 260 comprises an upper end 262, a lower end 264, an outer peripheral surface 266, an inner peripheral surface 268, a plurality of perforations or other detaching element 270, an inverted portion 272 (FIGS. 60–63) disposed at the lower end 264 and a cover strip 274 (FIGS. 61 and 62) which conceals a bonding material 276 (FIGS. 61–63) disposed upon an external portion 277 of the inverted portion 272. In use, as shown in FIG. 61, the sleeve 260 is disposed about the pot 240 wherein a portion of the lower end 264 of the sleeve 260 is placed adjacent a portion of an outer peripheral surface 241 of the pot 240. The cover strip 274 can then be removed revealing the bonding material 276 disposed upon a portion of an externally facing portion 277 of the inverted portion 272, as shown in FIGS. 61 and 62. The inverted portion 272 is then turned down as shown in FIG. 63 wherein the bonding material 276 is caused to face a portion of the outer peripheral surface 241 of the pot 240. Finally, shown in FIG. 64, is a sleeve/plant package 278 which is produced when the sleeve 260 is bondingly connected at the lower end 264 thereof to the pot 240.

Shown in FIGS. 65 and 66 are two pot covers 280 and 280a, respectively. The pot cover 280 shown in FIG. 65 is a pot cover such as those well known in the art and described previously herein and having a retaining space 282. The pot cover 280a has a retaining space 282a and a bonding material 284 disposed upon a portion of an inner peripheral surface 285 of the pot cover 280a. Any of the sleeve plant packages shown previously in FIGS. 56–64 may be disposed in either of the pot covers 280 or 280a. For example, sleeve/plant packages 238, 238a, 238b, and 278 may be disposed in the pot retaining space 282a of the pot cover 280a. The bonding material 284 disposed on the inner peripheral surface 285 of the pot cover 280a can be caused to bondingly connect to a portion of the sleeve/plant package 238, 238a, 238b or 278, sleeve/plant package 278 being shown, resulting in the sleeve/plant package 286 shown in FIG. 67. Alternatively, the sleeve/plant package 238c which has the bonding material 258c disposed on the outer peripheral surface 244 thereof can be disposed in pot cover 280. The pot cover 280, having no adhesive or bonding material disposed thereon, is bondingly connected to the sleeve/plant package 238c via the bonding material 258c.

Embodiments of FIGS. 68–73

Another version of the present invention and its use thereof is shown in FIGS. 68–73. FIG. 68 shows a covered potted plant designated by the general reference numeral 288. The covered potted plant 288 is comprised of a pot cover 290 which has a skirt portion 292, a base portion 294, an outer peripheral surface 296, and a retaining space 297. A potted plant 298 is disposed within the retaining space 297 of the pot cover 290. Shown in FIG. 69 is a sleeve designated by the general reference numeral 300 having a generally cylindrical shape and having an upper end 302, a lower end 304, an outer peripheral surface 306, an inner peripheral surface 308, a bonding material 310 disposed in the vicinity of the upper end 302, a vertical perforation 312 extending from near the upper end 302 to the lower end 304, a lateral perforation 314 extending circumferentially around the sleeve 300, and one or more expansion elements 316. In use the sleeve 300 is drawn up about the base portion 294 of the covered potted plant 288 of FIG. 68 wherein the bonding material 310 of the sleeve 300 is caused to be bondingly connected to a portion of the outer peripheral surface 296 of the pot cover 290 as shown in FIG. 70. The sleeve 300 can be then brought up about the covered potted plant 288 by grasping the lower end 304 of the sleeve 300 and drawing the lower end 304 in the direction 318 over the upper end of the covered potted plant 288 as shown in FIG. 71. Once fully drawn up about the covered potted plant 288, the sleeve 300 encompasses the skirt portion 292 of the pot cover 290 of the covered potted plant 288. The resulting sleeve/plant package is designated in FIG. 72 by the general reference numeral 320. Shown in FIG. 73 is the sleeve/plant package 320 after the upper portion of the sleeve 300 has been removed causing the skirt portion 292 of the pot cover 290 of the covered potted plant 288 to be exposed and the remaining portion 322 of the sleeve 300 left bondingly connected to a portion of the base portion 294 of the pot cover 290 of the covered potted plant 288.

In an alternative embodiment of a sleeve/cover combination, a sleeve having a skirt portion attached therein is shown in FIGS. 74 and 75 and designated by the general reference numeral 326. The sleeve/cover combination 326 comprises a sleeve 328. The sleeve 328 comprises a base portion 330 having a lower end 332, a sleeve portion 334 having an upper end 336, an outer peripheral surface 338, and an inner peripheral surface 340. A skirt component 342 comprising a lower end 344, an upper end 346, an outer peripheral surface 348, an inner peripheral surface 350 and a bonding material 352 is shown disposed within the sleeve 328. The skirt component 342 is bondingly connected at a portion of its outer peripheral surface 348 to a portion of the inner peripheral surface 340 of the sleeve 328 via the bonding material 352. The upper end 346 of the skirt component 342 is substantially surrounded and encompassed by the sleeve portion 334 of the sleeve 328. Shown in FIG. 75 is an alternate view of the skirt component 342 bondingly connected by the bonding material 352 to a portion of the inner peripheral surface 340 of the sleeve 328. Also shown in FIG. 75 are perforations 354 in the sleeve 328 for allowing detachment of the sleeve portion 334 away from the skirt component 342 and the base portion 330 thereby allowing the skirt component 342 to be exposed.

Embodiments of FIGS. 76–86

In yet another version of the present invention rather than providing a preformed pot cover, a sheet of material may be provided for forming a cover about a pot. In an embodiment as shown in FIG. 76 a sheet of material 360 is provided. The sheet of material 360 has an inner surface 362, an outer surface 364, a first edge 366, a second edge 368, a third edge 370, a fourth edge 372, and a bonding material 374 which is disposed upon a portion of the outer surface 364. A potted plant 298 can be disposed upon the inner surface 362 of the sheet of material 360, which can then be wrapped and formed into a decorative cover 376 about the potted plant 298 as shown in FIG. 77 in a manner well known to a person of ordinary skill in the art. The decorative cover 376 thus formed comprises a base portion 378, and a skirt portion 380. The bonding material 374 is therefore disposed upon an outer surface 381 of the decorative cover 376. Shown in FIGS. 78 and 79, and designated by the general reference numeral 382, is a sleeve having an outer peripheral surface 384, an inner peripheral surface 386, and an inner retaining space 387 surrounded by the inner peripheral surface 386. The potted plant 298 shown in FIG. 77 having the decorative cover 376 is then disposed in the inner retaining space 387 of the sleeve 382 wherein the bonding material 374 of the decorative cover 376 engages a portion of the inner peripheral surface 386 of the sleeve 382 thereby bondingly connecting a portion of the outer peripheral surface 381 of the decorative cover 376 to the inner peripheral surface 386 of the sleeve 382 in forming a sleeve/plant package 388 as shown in FIG. 79.

In an alternate version of the invention shown in FIGS. 80 and 81, a sleeve 382a having an outer peripheral surface 384a, an inner peripheral surface 386a, and an inner retaining space 387a is provided. Disposed upon a portion of the inner peripheral surface 386a of the sleeve 382a is a bonding material 390. A potted plant 298 such as that shown in FIG. 77 having a decorative cover 376 which has a bonding material 374 thereon is disposed within the inner retaining space 387a of the sleeve 382a to form a sleeve/cover package 388a wherein the bonding material 390 of the sleeve 382a bondingly connects to the bonding material 374 of the decorative cover 376. Preferably, when both the sleeve 382a and the decorative cover 376 have a bonding material thereon the bonding material is a cohesive wherein the bonding material 390 cohesively connects to the bonding material 374.

Figure 82:
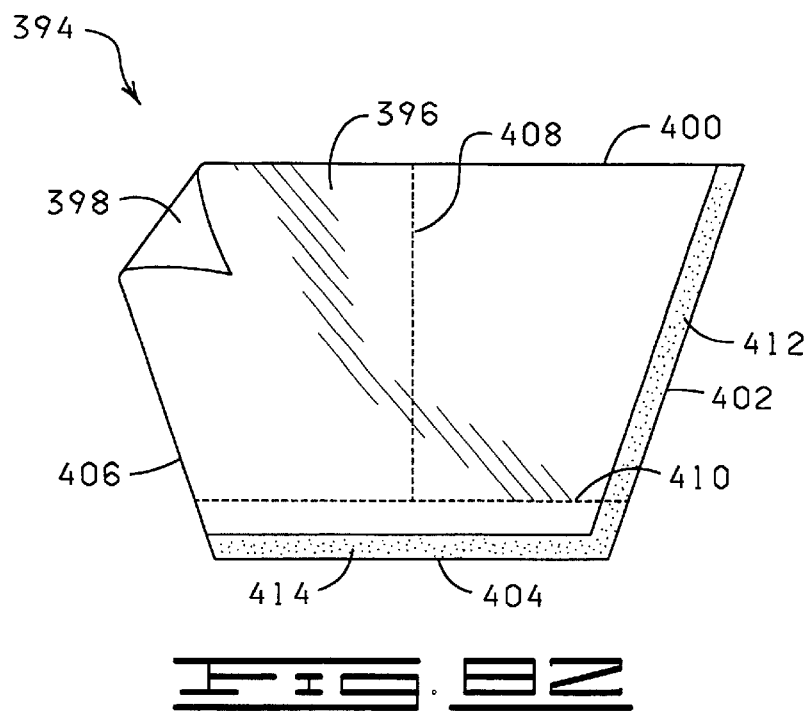
FIG. 82 is an elevational view of a sheet of material having a bonding material near two edges of the sheet of material.
Figure 83:
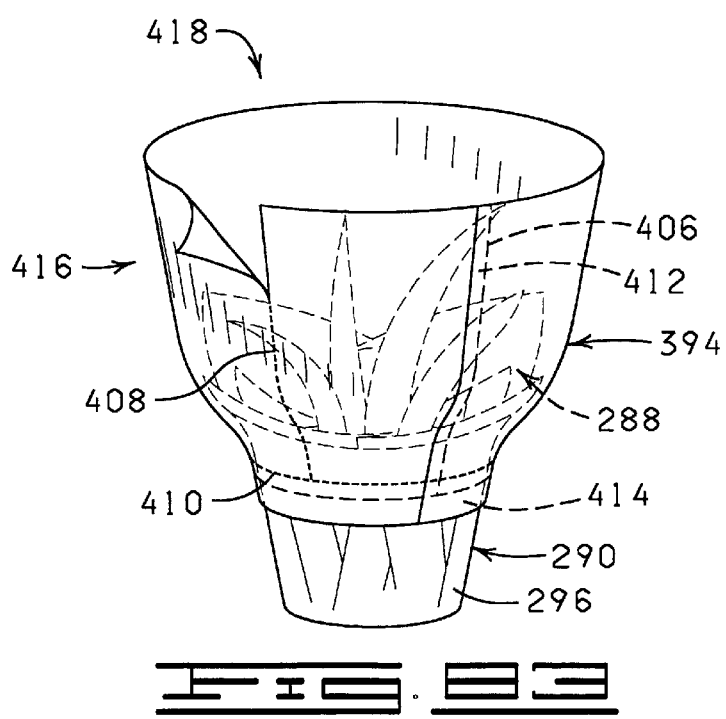
FIG. 83 is a perspective view of the sheet of material of FIG. 82 wrapped about a covered potted plant in accordance with the method of the present invention.

In an alternative version of the present invention, as shown in FIGS. 82 and 83, the sleeve may not be a tube but instead may be formed of a flat sheet of material having a generally trapezoidal, square or rectangular shape. It will be appreciated that any size or shape of sheet of material may be utilized as long as this sheet of material functions in the manner described herein in accordance with the present invention. Shown in FIG. 82 is a sheet of material designated by the general reference numeral 394. The sheet of material 394 has an inner surface 396, an outer surface 398, a first edge 400, a second edge 402, a third edge 404 and a fourth edge 406. The sheet 394 further has vertical perforations 408 and lateral perforations 410 which represent detaching elements. The sheet 394 further has a first bonding strip 412 flanking the second edge 402 and a second bonding strip 414 which is disposed horizontally and flanks the third edge 404. The covered potted plant 288 having the pot cover 290 is provided as shown previously in FIG. 73 herein. The sheet of material 394 can then be wrapped about the covered potted plant 288 forming a generally frusto-conical shaped sleeve 416 as shown in FIG. 83. The first bonding strip 412 which here is shown to be vertically oriented is caused to engage and bondingly connect to the fourth edge 406 of the sheet of material 394 as indicated in FIG. 83 thereby forming an overlapping sealed area between the first bonding strip 412 and the portion of the surface of the sheet of material 394 near the fourth edge 406. The second bonding strip 414 which here is shown to be horizontally oriented is caused to engage and bondingly connect circumferentially about a portion of the outer peripheral surface 296 of the pot cover 290 formed about the covered potted plant 288 thereby forming a generally frusto-conical shaped sleeve 416 and forming a sleeve/cover package 418 comprising the covered potted plant 288 and then the sleeve 416. A portion of the sleeve 416 can then be removed by detaching the portion along the perforations 408 and 410.

Another version of the invention, as shown in FIGS. 84–86. In FIG. 84, a sheet of material designated by the general reference numeral 394a is provided. The sheet of material 394a has an inner surface 396a, an outer surface 398a, a first edge 400a, a second edge 402a, a third edge 404a and a fourth edge 406a. The sheet of material 394a further has a plurality of vertical perforations 408a and a plurality of lateral perforations 410a. Further, the sheet of material 394a has a first bonding strip 412a which is generally disposed along the second edge 402a, a second bonding strip 414a which is generally disposed along the third edge 404a and a sealing strip 420a which is generally disposed along the first edge 400a. As indicated in the embodiment previously shown in FIGS. 82 and 83 the sheet of material 394a can be wrapped about the covered potted plant 288 to form a sleeve/cover package 424. As shown in FIGS. 85 and 86 the sealing strip 420a can be sealed along its length to seal the upper end 421 of the sleeve 422 formed therefrom for reducing gas exchange or moisture loss from the covered potted plant 288.

It should also be noted that for all versions of preformed covers and sheets of material described above and elsewhere herein, an additional bonding material may be disposed either on the outer surface of the cover, the inner surface of the cover, or both the outer and inner surfaces of the cover for allowing portions of the cover to be crimpingly connected to the pot in exactly the same manner as described elsewhere herein. Further, in each of these versions described herein the sleeve which is bondingly connected to the cover comprises a detaching element as described earlier for allowing the sleeve or portion thereof to be detached from the cover thereby exposing the skirt portion of the base of the cover or another portion of the base and allowing the portion thereby exposed to extend angularly from the base of the cover. Further, in any of the versions of the present invention described herein, it may be desirable to have a cover strip covering the bonding material disposed on any portion of the object for preventing the bonding material from bonding to a surface until the desired time. Further in each of the cases described herein wherein a sleeve is applied to a pot or a covered pot, the sleeve may be applied thereto either by depositing the pot or covered pot downwardly into the open retaining space of the sleeve, or the sleeve may be brought upwardly about the pot or covered pot from below the pot or covered pot as shown for example using the pedestal of FIGS. 54 and 55.

It should be further noted that features of the versions of the present invention shown in FIGS. 6–20 such as closure bonding areas, support extensions, handles, additional perforations and combinations of material may be used alone or in combination as elements of any of the embodiments described above herein.

Changes may be made in the construction and the operation of the various components, elements and assemblies described herein or in the steps or the sequence of steps of the methods described herein without departing from the spirit and scope of the invention as defined in the following claims.

What is claimed is:

1. A method of covering a potted plant, comprising:
    providing the potted plant comprising a floral grouping disposed in a pot, the pot having a lower end, an upper rim and an outer peripheral surface;
    providing a plant cover comprising a lower portion having a lower end, an upper end, an inner peripheral surface and an outer peripheral surface, and wherein the inner peripheral surface of the lower portion defines and encompasses an inner retaining space, the lower portion sized to contain the pot, and the plant cover further comprising an upper portion which is detachable from the lower portion via a detaching element in the plant cover, and the lower portion further comprising a heat shrinkable bonding material;
    disposing the potted plant into the inner retaining space of the lower portion of the plant cover wherein the pot is covered by the lower portion, the upper portion surrounding the floral grouping in the pot; and
    securing the plant cover about the pot by heating the heat shrinkable bonding material thereby forming a crimp in the plant cover.

2. The method of claim 1 wherein in the step of providing a plant cover, the plant cover is further defined as constructed from materials selected from the group consisting of treated or untreated paper, metal foil, polymeric film, non-polymeric film, cardboard, fiber, cloth, burlap, and laminations or combinations thereof.

3. The method of claim 1 wherein in the step of securing the plant cover, the crimp is formed below the upper rim of the pot.

4. The method claim 1 wherein in the step of securing the plant cover, the crimp is formed above the upper rim of the pot.

5. The method of claim 1 wherein in the step of providing the plant cover, the lower portion of the plant cover further comprises a base portion and a skirt portion.

6. A plant package comprising a potted plant having a plant cover secured thereabout, the plant package produced by the method of claim 1.

7. A method of covering a potted plant, comprising:
    providing the potted plant comprising a floral grouping disposed in a pot, the pot having a lower end, an upper rim and an outer peripheral surface;
    providing a plant cover comprising a base portion and a skirt portion, the base portion having an inner retaining space and sized to contain the pot of the potted plant, and the plant cover comprising a heat shrinkable bonding material;
    disposing the potted plant into the inner retaining space of the base portion wherein the pot is covered by the base portion; and
    securing the plant cover about the pot by heating the heat shrinkable bonding material thereby forming a crimp in the plant cover.

8. The method of claim 7 wherein in the step of securing the plant cover, the crimp is formed below the upper rim of the pot.

9. The method claim 7 wherein in the step of securing the plant cover, the crimp is formed above the upper rim of the pot.

10. The method of claim 7 wherein in the step of providing a plant cover, the plant cover is further defined as constructed from materials selected from the group consisting of treated or untreated paper, metal foil, polymeric film, non-polymeric film, cardboard, fiber, cloth, burlap, and laminations or combinations thereof.

11. A plant package comprising a potted plant having a plant cover secured thereabout, the plant package produced by the method of claim 7.

12. A method of covering a potted plant, comprising:
    providing the potted plant comprising a floral grouping disposed in a pot, the pot having a lower end, an upper rim and an outer peripheral surface;
    providing a plant cover comprising a base portion and a skirt portion, the base portion having an inner retaining space and sized to contain the pot of the potted plant, and the plant cover comprising a heat shrinkable bonding material;
    disposing the potted plant into the inner retaining space of the base portion wherein the pot is covered by the base portion; and
    securing the plant cover about the pot by heating the heat shrinkable bonding material thereby forming a crimp in the plant cover in a position below the upper rim of the pot.

13. A plant package comprising a potted plant having a plant cover secured thereabout, the plant package produced by the method of claim 12.

14. A method of covering a potted plant, comprising:
    providing the potted plant comprising a floral grouping disposed in a pot, the pot having a lower end, an upper rim and an outer peripheral surface;
    providing a plant cover comprising a base portion and a skirt portion, the base portion having an inner retaining space and sized to contain the pot of the potted plant, and the plant cover comprising a heat shrinkable bonding material;
    disposing the potted plant into the inner retaining space of the base portion wherein the pot is covered by the base portion; and
    securing the plant cover about the pot by heating the heat shrinkable bonding material thereby forming a crimp in the plant cover in a position above the upper rim of the pot.

15. A plant package comprising a potted plant having a plant cover secured thereabout, the plant package produced by the method of claim 14.

16. A method of covering a potted plant, comprising:

providing the potted plant comprising a floral grouping disposed in a pot, the pot having a lower end, an upper rim and an outer peripheral surface;

providing a plant cover having an inner retaining space and sized to contain the pot of the potted plant, and the plant cover comprising a heat shrinkable bonding material;

disposing the potted plant into the inner retaining space of the plant cover; and securing the plant cover about the pot by heating the heat shrinkable bonding material thereby forming a crimp in the plant cover in a position above the upper rim of the pot.

17. A plant package comprising a potted plant having a plant cover secured thereabout, the plant package produced by the method of claim 16.

18. A method of covering a potted plant, comprising:

providing the potted plant comprising a floral grouping disposed in a pot, the pot having a lower end, an upper rim and an outer peripheral surface;

providing a plant cover having an inner retaining space and sized to contain the pot of the potted plant, and the plant cover comprising a heat shrinkable bonding material;

disposing the potted plant into the inner retaining space of the plant cover; and securing the plant cover about the pot by heating the heat shrinkable bonding material thereby forming a crimp in the plant cover in a position below the upper rim of the pot.

19. A plant package comprising a potted plant having a plant cover secured thereabout, the plant package produced by the method of claim 18.

20. A method of covering a potted plant, comprising:

providing the potted plant comprising a floral grouping disposed in a pot, the pot having a lower end, an upper rim and an outer peripheral surface;

providing a plant cover comprising a lower portion having a lower end, an upper end, an inner peripheral surface and an outer peripheral surface, and wherein the inner peripheral surface of the lower portion defines and encompasses an inner retaining space, the lower portion sized to contain the pot, and the plant cover further comprising an upper portion which is detachable from the lower portion via a detaching element in the plant cover, and the lower portion further comprising a heat shrinkable bonding material;

disposing the potted plant into the inner retaining space of the lower portion of the plant cover wherein the pot is covered by the lower portion, the upper portion surrounding the floral grouping in the pot; and securing the plant cover about the pot by heating the heat shrinkable bonding material.

21. The method of claim 20 wherein in the step of providing the plant cover, the lower portion of the plant cover further comprises a base portion and a skirt portion.

22. A plant package comprising a potted plant having a plant cover secured thereabout, the plant package produced by the method of claim 20.

23. A method of covering a potted plant, comprising:

providing the potted plant comprising a floral grouping disposed in a pot, the pot having a lower end, an upper rim and an outer peripheral surface;

providing a plant cover comprising a base portion and a skirt portion, the base portion having an inner retaining space and sized to contain the pot of the potted plant, and the plant cover comprising a heat shrinkable bonding material;

disposing the potted plant into the inner retaining space of the base portion wherein the pot is covered by the base portion; and securing the plant cover about the pot by heating the heat shrinkable bonding material.

24. The method of claim 23 wherein in the step of providing a plant cover, the plant cover is further defined as constructed from materials selected from the group consisting of treated or untreated paper, metal foil, polymeric film, non-polymeric film, cardboard, fiber, cloth, burlap, and laminations or combinations thereof.

25. A plant package comprising a potted plant having a plant cover secured thereabout, the plant package produced by the method of claim 23.

26. A method of covering a potted plant, comprising:

providing the potted plant comprising a floral grouping disposed in a pot, the pot having a lower end, an upper rim and an outer peripheral surface;

providing a plant cover having an inner retaining space and sized to contain the pot of the potted plant, and the plant cover comprising a heat shrinkable bonding material;

disposing the potted plant into the inner retaining space of the plant cover; and securing the plant cover about the pot by heating the heat shrinkable bonding material.

27. The method of claim 26, wherein in the step of providing a plant cover, the plant cover is further defined as constructed from materials selected from the group consisting of treated or untreated paper, metal foil, polymeric film, non-polymeric film, cardboard, fiber, cloth, burlap, and laminations or combinations thereof.

28. A plant package comprising a potted plant having a plant cover secured thereabout, the plant package produced by the method of claim 26.

* * * * *